(12) United States Patent
Pyo

(10) Patent No.: US 11,262,803 B2
(45) Date of Patent: Mar. 1, 2022

(54) DISPLAY DEVICE

(71) Applicant: LG ELECTRONICS INC., Seoul (KR)

(72) Inventor: Jonggil Pyo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/079,172

(22) Filed: Oct. 23, 2020

(65) Prior Publication Data

US 2021/0124400 A1    Apr. 29, 2021

(30) Foreign Application Priority Data

Oct. 25, 2019   (WO) ................ PCT/KR2019/014138

(51) Int. Cl.
   *G06F 1/16*   (2006.01)

(52) U.S. Cl.
   CPC .................................. *G06F 1/1652* (2013.01)

(58) Field of Classification Search
   CPC ............................. G06F 1/1652; G06F 1/1601
   See application file for complete search history.

(56) References Cited

U.S. PATENT DOCUMENTS

| | | | |
|---|---|---|---|
| 2015/0029229 A1* | 1/2015 | Voutsas | G09G 3/035 345/661 |
| 2017/0156225 A1* | 6/2017 | Heo | H05K 5/0217 |
| 2017/0196102 A1* | 7/2017 | Shin | H05K 1/111 |
| 2017/0309226 A1* | 10/2017 | In | G09G 3/20 |
| 2017/0318693 A1* | 11/2017 | Kim | H04N 5/64 |
| 2017/0325343 A1* | 11/2017 | Seo | H01L 51/0097 |
| 2017/0367198 A1* | 12/2017 | Park | G06F 1/1652 |
| 2018/0032106 A1* | 2/2018 | Yu | G06F 1/1652 |
| 2018/0070466 A1* | 3/2018 | Kim | H05K 5/0217 |
| 2018/0114471 A1* | 4/2018 | Park | G09F 9/301 |
| 2018/0228036 A1* | 8/2018 | Mou | H05K 5/0217 |
| 2019/0053387 A1* | 2/2019 | Choi | G06F 1/1652 |

* cited by examiner

*Primary Examiner* — Rockshana D Chowdhury
(74) *Attorney, Agent, or Firm* — Lee, Hong, Degerman, Kang & Waimey PC

(57) ABSTRACT

A display device is disclosed. The display device includes a housing, a roller disposed in the housing, a display unit configured to be wound around or unwound from the roller, a foldable link having a first side pivotably coupled to the housing and a second side pivotably coupled to an upper part of the display unit, a motor disposed in the housing and configured to drive a pivoting movement of the foldable link such that the foldable link is extended out of or retracted into the housing, a fulcrum disposed adjacent to the first side of the foldable link, a lever extending in a longitudinal direction of the housing and pivotably mounted on the fulcrum and comprising a first side and a second side oppositely positioned with respect to the fulcrum, and an elastic member coupled to the second side of the lever, when the foldable link is retracted into the housing the foldable link contacts the first side of the lever to cause the lever to pivot about the fulcrum.

10 Claims, 34 Drawing Sheets

DISPLAY DEVICE

CROSS-REFERENCE TO RELATED APPLICATION

Pursuant to 35 U.S.C. § 119, this application claims the benefit of an earlier filing date and right of priority to International Application No. PCT/KR2019/014138, filed on Oct. 25, 2019, the contents of which are hereby incorporated by reference herein its entirety.

BACKGROUND OF THE INVENTION

1. Field of the Invention

The present disclosure relates to a display device.

2. Description of the Related Art

As the information society has developed, the demand for display devices is increasing in various forms, and accordingly, in recent years, various display devices such as a liquid crystal display (LCD), plasma display panel (PDP), electroluminescent display (ELD), vacuum fluorescent display (VFD), and the like have been studied and used.

There among, a display device using an organic light emitting diode (OLED) has excellent luminance and viewing angle characteristics in comparison with a liquid crystal display device and does not require a backlight unit, thereby being implemented in an ultrathin type.

In addition, a flexible display panel can be bent or wound around a roller. The flexible display panel may be used to implement a display device that unfolds on a roller or winds around the roller. There is a necessity for many studies on a structure for winding a flexible display panel around a roller or unwinding the flexible display panel from the roller.

SUMMARY OF THE INVENTION

It is an object of the present disclosure to solve the above and other problems.

It is another object of the present disclosure to provide a display device capable of reducing load at the time of initial driving for unwinding a display panel from a roller.

It is another object of the present disclosure to provide a display device capable of reducing initial driving force at the time of erecting a link.

It is a further object of the present disclosure to provide a display device capable of reducing impact at the time of seating the link.

In accordance with an aspect of the present disclosure, the above and other objects can be accomplished by the provision of a display device including a housing; a roller disposed in the housing; a display unit configured to be wound around or unwound from the roller; a foldable link having a first side pivotably coupled to the housing and a second side pivotably coupled to an upper part of the display unit; a motor disposed in the housing and configured to drive a pivoting movement of the foldable link such that the foldable link is extended out of or retracted into the housing; a fulcrum disposed adjacent to the first side of the foldable link; a lever extending in a longitudinal direction of the housing and pivotably mounted on the fulcrum and comprising a first side and a second side oppositely positioned with respect to the fulcrum; and an elastic member coupled to the second side of the lever, when the foldable link is retracted into the housing the foldable link contacts the first side of the lever to cause the lever to pivot about the fulcrum.

In accordance with another aspect of the present disclosure, the foldable link may include a lower link having one side pivotably connected to the housing; and an upper link having one side pivotably connected to the lower link and the other side pivotably connected to the upper part of the display unit, and the lower link may contact the first side of the lever when the foldable link is retracted into the housing.

In accordance with another aspect of the present disclosure, the fulcrum may include: a lever base coupled to the housing; a first support configured to support a first shaft; and a second support spaced apart from the first support and configured to support a second shaft parallel to the first shaft, the lever may be pivotably mounted at the first shaft of the first support, and the elastic member may be coupled to the second shaft of the second support and the second side of the lever.

In accordance with another aspect of the present disclosure, the lever may include: a middle region coupled to the first shaft of the first support; a first body extending from the middle region toward a mounting position of the lower link; a second body extending from the middle region opposite the first body; a first fork formed at a distal end of the first body; a second fork formed at a distal end of the second body; a roller shaft extending across the first fork; and a roller positioned on the roller shaft so as to be rotatable on the roller shaft.

In accordance with another aspect of the present disclosure, the roller may include a urethane material.

In accordance with another aspect of the present disclosure, the first body and second body may be angled in an upward direction, and the elastic member may be an extension spring.

In accordance with another aspect of the present disclosure, the elastic member may be extended when the foldable link is retracted into the housing and may be contracted when the foldable link is extended out of the housing.

In accordance with another aspect of the present disclosure, a distance between the prongs of the first fork may be greater than a distance between prongs of the second fork.

In accordance with another aspect of the present disclosure, the motor may include a rotary encoder configured to sense angular displacement of a driving shaft of the motor, and the display device may further include a controller configured to control the motor based on information about the angular displacement of the driving shaft acquired from the rotary encoder.

In accordance with another aspect of the present disclosure, the display device may further include: a first gear fixed to a driving shaft of the motor; and a second gear fixed to the lower link and comprising a rotary shaft aligned with a pivot shaft of the lower link, the second gear may be engaged with the first gear.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

Figure 1:
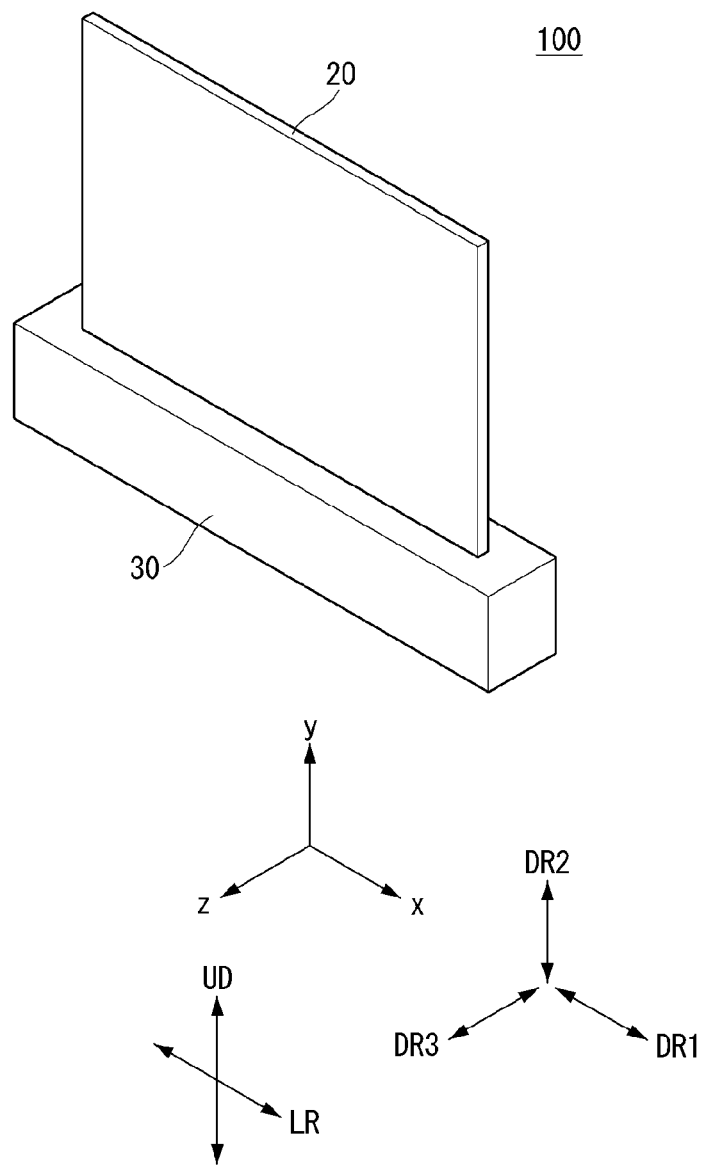
FIGS. 1 to 34 are views showing examples of a display device according to embodiments of the present disclosure.

Referring to FIG. 1, a display device 100 may include a display unit 20 and a housing 30. The housing 30 may have an internal space formed therein. At least a portion of the display unit 20 may be located inside the housing 30. At least a portion of the display unit 20 may be located outside the housing 30. The display unit 20 may display an image on the front surface thereof.

The direction parallel to the longitudinal direction of the housing 30 may be referred to as a first direction DR1. The first direction DR1 may be parallel to a +x axis direction or a −x axis direction. The +x axis direction may be referred to as a rightward direction. The −x axis direction may be referred to as a leftward direction. The direction in which the display unit 20 displays an image may be referred to as a +z axis, a forward direction, or the front. The direction opposite the direction in which the display unit 20 displays an image may be referred to as a −z axis, a rearward direction, or the rear. A third direction DR3 may be parallel to the +z axis direction or the −z axis direction. The direction parallel to the height direction of the display device 100 may be referred to as a second direction DR2. The second direction DR2 may be parallel to a +y axis direction or a −y axis direction. The y axis direction may be referred to as an upward direction. The −y axis direction may be referred to as a downward direction. The third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

A leftward-rightward direction LR may be parallel to the first direction DR1, and an upward-downward direction UD may be parallel to the second direction DR2.

Figure 2:
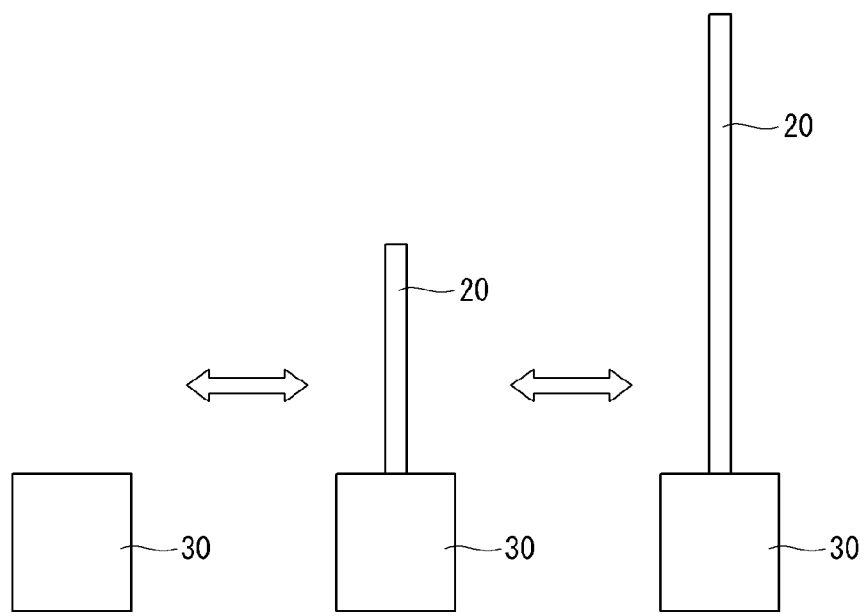

Referring to FIG. 2, the display unit 20 may be entirely located inside the housing 30. At least a portion of the display unit 20 may be located outside the housing 30. The degree to which the display unit 20 is exposed to the outside of the housing 30 may be adjusted as necessary.

Figure 3:
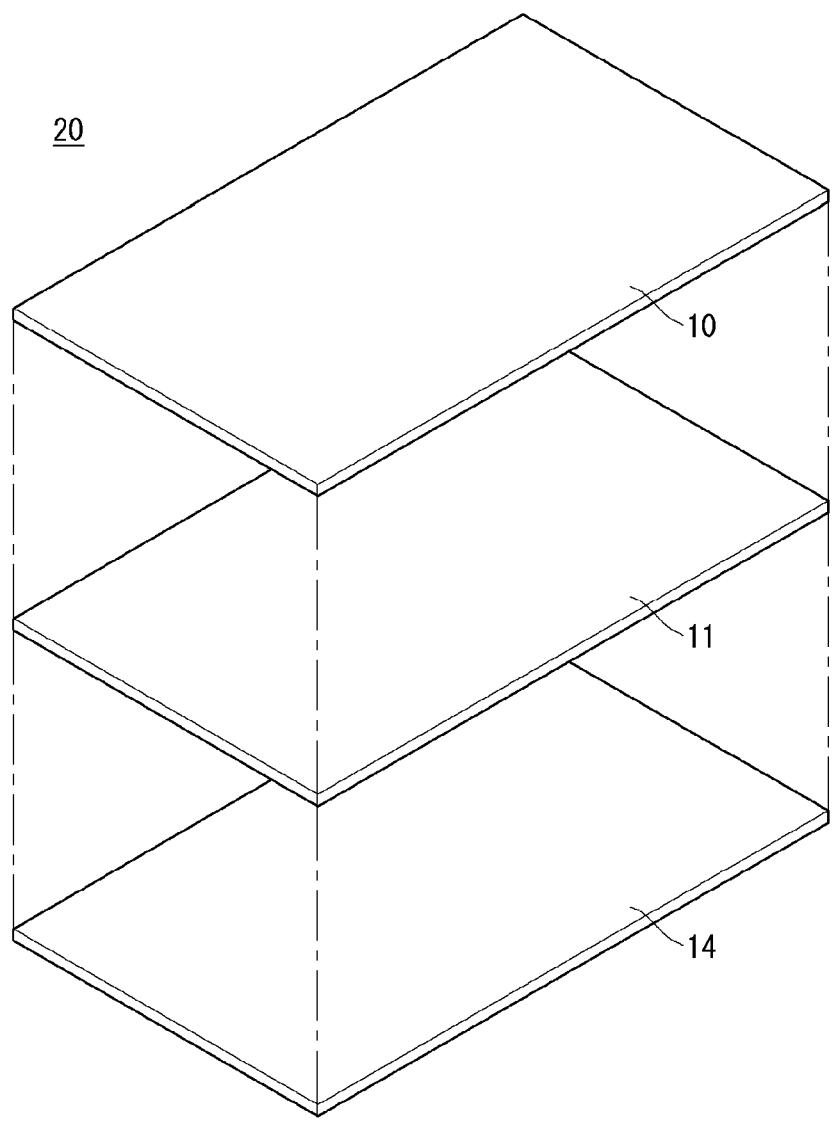

Referring to FIG. 3, a display panel 10 may be flexible. For example, the display panel 10 may be an organic light emitting display (OLED).

The display panel 10 may have a front surface for displaying an image. The display panel 10 may have a rear surface facing the front surface. The front surface of the display panel 10 may be covered with a light transmissive material. For example, the light transmissive material may be glass, resin, or plastic.

A plate 11 may be coupled to the rear surface of the display panel 10. The plate 11 may be coupled, fastened or attached to the rear surface of the display panel 10. The plate 11 may include a metal material. The plate 11 may be referred to as a module cover 11, a cover 11, a display panel cover 11, or a panel cover 11.

A resin layer 14 may be coupled to the rear surface of the plate 11. The resin layer 14 may cover the plate 11. The plate 11 may not be exposed outside due to the resin layer 14.

Figure 4:
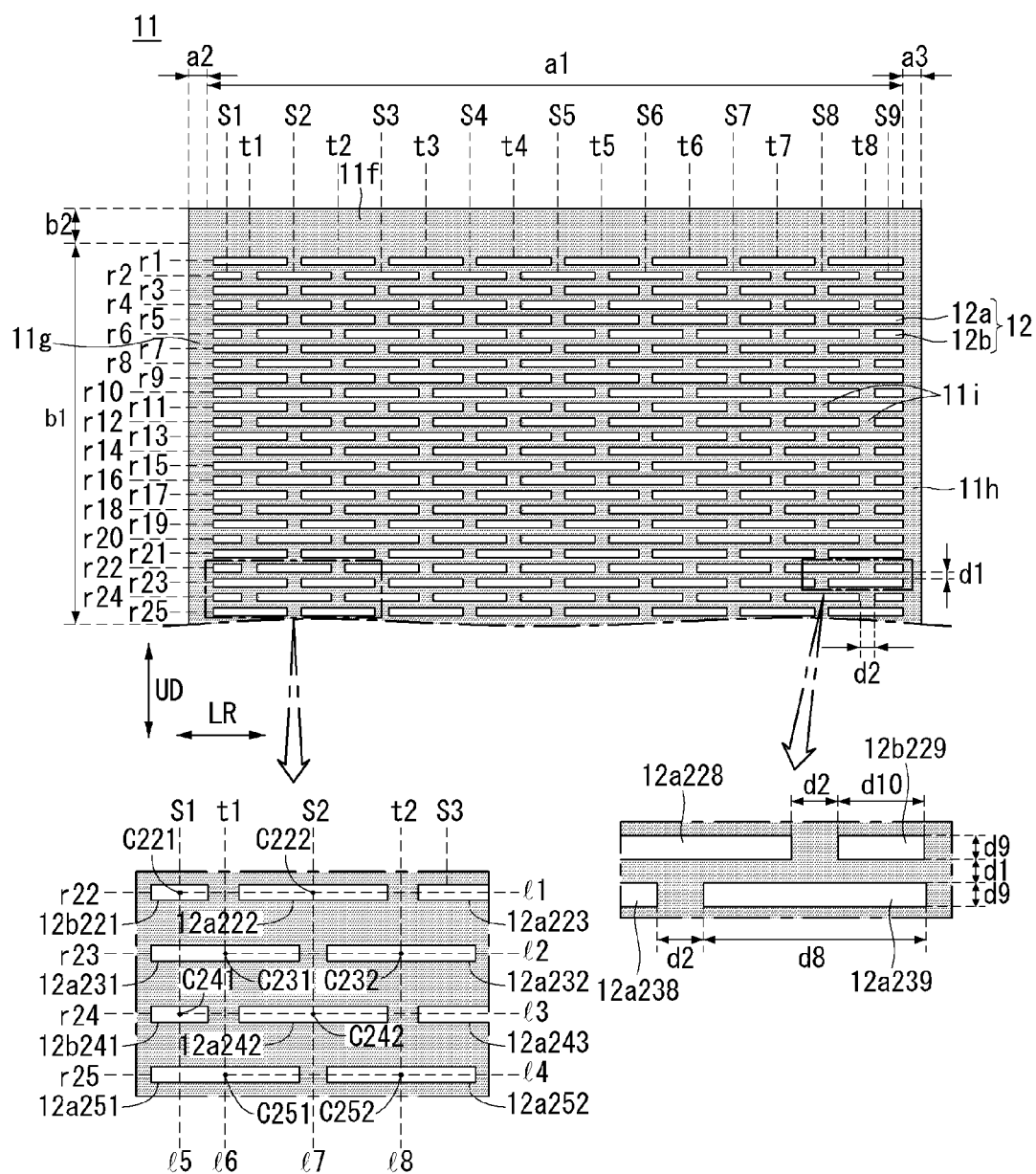

Referring to FIG. 4, the plate 11 may include a plurality of holes 12. The plate may include a region in which the holes 12 are formed and regions 11$f$, 11$g$, and 11$h$ in which the holes 12 are not formed. The regions 11$f$, 11$g$, and 11$h$ in which the holes 12 are not formed may surround the region in which the holes 12 are formed. The regions 11$f$, 11$g$, and 11$h$ in which the holes 12 are not formed may protect the edge of the display panel 10. The holes 12 may also be referred to as openings 12.

The first region 11$g$ in which the holes 12 are not formed, the region in which the holes 12 are formed, and the second region 11$g$ in which the holes 12 are not formed may be sequentially located in the leftward-rightward direction LR of the plate 11. The width of the first region 11$g$ in the leftward-rightward direction LR may be a2. The width of the region in which the holes 12 are formed in the leftward-rightward direction LR may be a1. The width of the second region 11$h$ in the leftward-rightward direction LR may be a3.

The third region 11$f$ in which the holes 12 are not formed and the region in which the holes 12 are formed may be sequentially located in the upward-downward direction UD. The height of the third region 11$f$ in the upward-downward direction UD may be b2. The height of the region in which the holes 12 are formed in the upward-downward direction UD may be b1.

The third region 11$f$ in which the holes 12 are not formed may be coupled to a mechanical part. For example, the mechanical part may be an upper bar. The upper bar may be coupled to a link.

The holes 12 formed through the plate 11. The holes 12 may be formed by punching the plate 11. The holes 12 may be slits 12$a$ and 12$b$. The slits 12$a$ and 12$b$ may extend in the leftward-rightward direction LR of the plate 11. The holes 12 may include relatively long slits 12$a$ and relatively short slits 12$b$.

Each of the relatively long slits 12$a$ may have a length d8 and a width d9. Each of the relatively short slits 12$b$ may have a length d10 and a width d9.

The slits 12$a$ and 12$b$ may be spaced apart from each other in the leftward-rightward direction LR of the plate 11. Neighboring slits 12$a$ and 12$b$ may be located so as to be spaced apart from each other by a predetermined distance d2.

The slits 12$a$ and 12$b$ may be spaced apart from each other in the upward-downward direction UD of the plate 11.

Neighboring slits 12a and 12b may be located so as to be spaced apart from each other by a predetermined distance d1.

In the case in which the distances d1 and d2 between the slits 12a and 12b are decreased, the plate 11 may be easily wound or unwound. In the case in which the distances d1 and d2 between the slits 12a and 12b are increased, elasticity of the plate 11 may be increased.

The display panel 10 may have a very small thickness. The display panel 10 may easily wrinkle due to the small thickness thereof. The display panel 10 may be easily broken by external impact due to the small thickness thereof.

The plate 11 may be fixed to the display panel 10 to increase rigidity of the display panel 10. The plate 11 may support the display panel 10, thereby preventing the display panel 10 from wrinkling.

The plate 11 may be made of a metal material that exhibits high rigidity. The plate 11 is preferably made of a material that exhibits high elastic strength. Since the plate 11 has the slits 12a and 12b, the plate 11 may be wound around or unwound from a roller 143. Since the plate 11 has the slits 12a and 12b, permanent deformation of the plate 11 may be prevented even when the plate is wound around or unwound from the roller 143.

An adhesive layer 13 may be formed at the rear surface of the display panel 10. The adhesive layer 13 may fix the display panel 10 to the plate 11. The display panel 10, the adhesive layer 13, and the plate 12 may be coupled integrally to each other so as to form a display unit, and may be wound around or unwound from the roller 143.

The slits 12a and 12b may be disposed in rows and columns. Odd rows r1, r3, r5, r7, r9, r11, r13, r15, r17, r19, r21, r23, and r25 may be constituted by the relatively long slits 12a. The slits 12a in the odd rows r1, r3, r5, r7, r9, r11, r13, r15, r17, r19, r21, r23, and r25 may constitute columns t1, t2, t3, t4, t5, t6, t7, and t8.

Even rows r2, r4, r6, r8, r10, r12, r14, r16, r18, r20, r22, and r24 may be constituted by the relatively short slits 12b and the relatively long slits 12a. The slits 12a and 12b in the even rows may constitute columns. The slits 12a and 12b in the even rows r2, r4, r6, r8, r10, r12, r14, r16, r18, r20, r22, and r24 may constitute columns s1, s2, s3, s4, s5, s6, s7, s8, and s9.

The relatively short slits 12b and the relatively long slits 12a may be alternately disposed in the upward-downward direction UD. The relatively short slits 12b may be disposed at opposite sides of the even rows r2, r4, r6, r8, r10, r12, r14, r16, r18, r20, r22, and r24 in the leftward-rightward direction LR.

A straight line 11 that links the center c221 of a first slit 12b221 in a 22nd row r22 and the center c222 of a second slit 12b222 in the 22nd row r22 may pass through the centers of the other slits in the 22nd row r22.

A straight line 12 that links the center c231 of a first slit 12b231 in a 23rd row r23 and the center c232 of a second slit 12b232 in the 23rd row r23 may pass through the centers of the other slits in the 23rd row r23.

A straight line 13 that links the center c241 of a first slit 12b241 in a 24th row r24 and the center c242 of a second slit 12b242 in the 24th row r24 may pass through the centers of the other slits in the 24th row r24.

A straight line 14 that links the center c251 of a first slit 12b251 in a 25th row r25 and the center c252 of a second slit 12b252 in the 25th row r25 may pass through the centers of the other slits in the 25th row r25.

A straight line 15 that links the center c221 of an 11th slit 12b221 in a first column s1 of the even rows r2, r4, r6, r8, r10, r12, r14, r16, r18, r20, r22, and r24 and the center c241 of a 12th slit 12b241 in the first column s1 may pass through the centers of the other slits in the first column s1.

A straight line 16 that links the center c231 of a 12th slit 12b231 in a first column t1 of the odd rows r1, r3, r5, r7, r9, r11, r13, r15, r17, r19, r21, r23, and r25 and the center c251 of a 13rd slit 12b251 in the first column t1 may pass through the centers of the other slits in the first column t1.

A straight line 17 that links the center c222 of an 11th slit 12b222 in a second column s2 of the even rows r2, r4, r6, r8, r10, r12, r14, r16, r18, r20, r22, and r24 and the center c242 of a 12th slit 12b242 in the second column s2 may pass through the centers of the other slits in the second column s2.

A straight line 18 that links the center c232 of a 12th slit 12b232 in a second column t2 of the odd rows r1, r3, r5, r7, r9, r11, r13, r15, r17, r19, r21, r23, and r25 and the center c252 of a 13rd slit 12b252 in the second column t2 may pass through the centers of the other slits in the second column t2.

Figure 5:
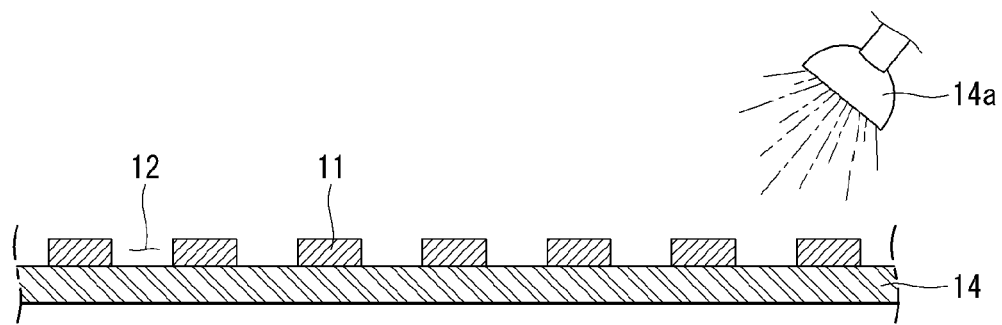
Figure 6:
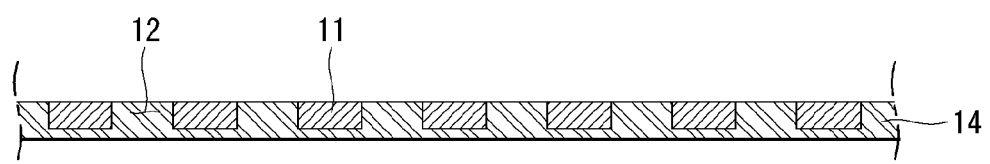

Referring to FIGS. 5 and 6, the first resin layer 14 and the plate 11 may be coupled to each other through a lamination process. The plate 11 may be placed on the first resin layer 14. The plate 11 and the first resin layer 14 may be heated by a heater. A portion of the first resin layer 14 may melt. The melted portion of the first resin layer 14 may be adhered to the plate 11. A hole 12 in the plate 11 may be filled with the melted portion of the first resin layer 14. The plate 11 may be received in the first resin layer 14.

When the heated plate 11 and first resin layer 14 are cooled, the plate 11 and the first resin layer 14 may be integrated. The front surface of the assembly of the plate 11 and the first resin layer 14 may be flat.

Figure 7:
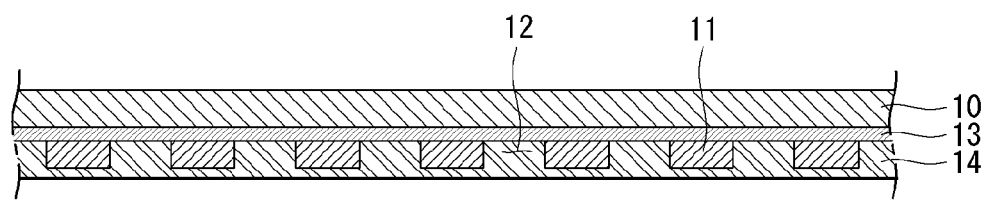
Figure 8:
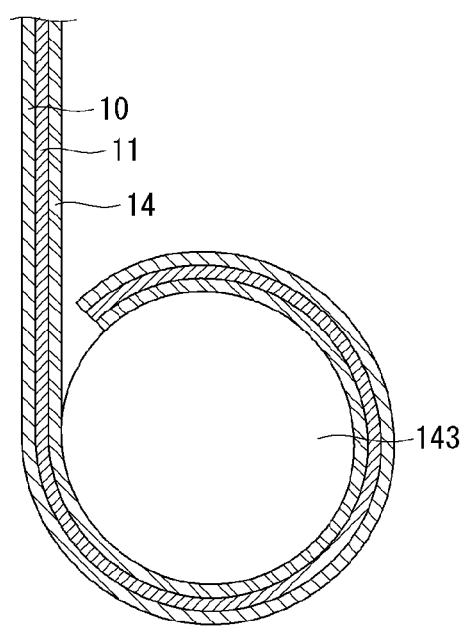

Referring to FIGS. 7 and 8, the adhesive layer 13 may be formed at the rear surface of the display panel 10. The adhesive layer 13 may fix the display panel 10 to the plate 11. Since the front surface of the assembly of the plate 11 and the first resin layer 14 is flat, the adhesive layer 13 may fix the display panel 10 to the first resin layer 14.

The first resin layer 14 may be a material that exhibits high softness. For example, the first resin layer 14 may be urethane or rubber.

The display panel 10, the adhesive layer 13, the plate 11, and the first resin layer 14 may be coupled integrally to each other so as to form a display unit, and may be wound around or unwound from the roller 143.

Figure 9:
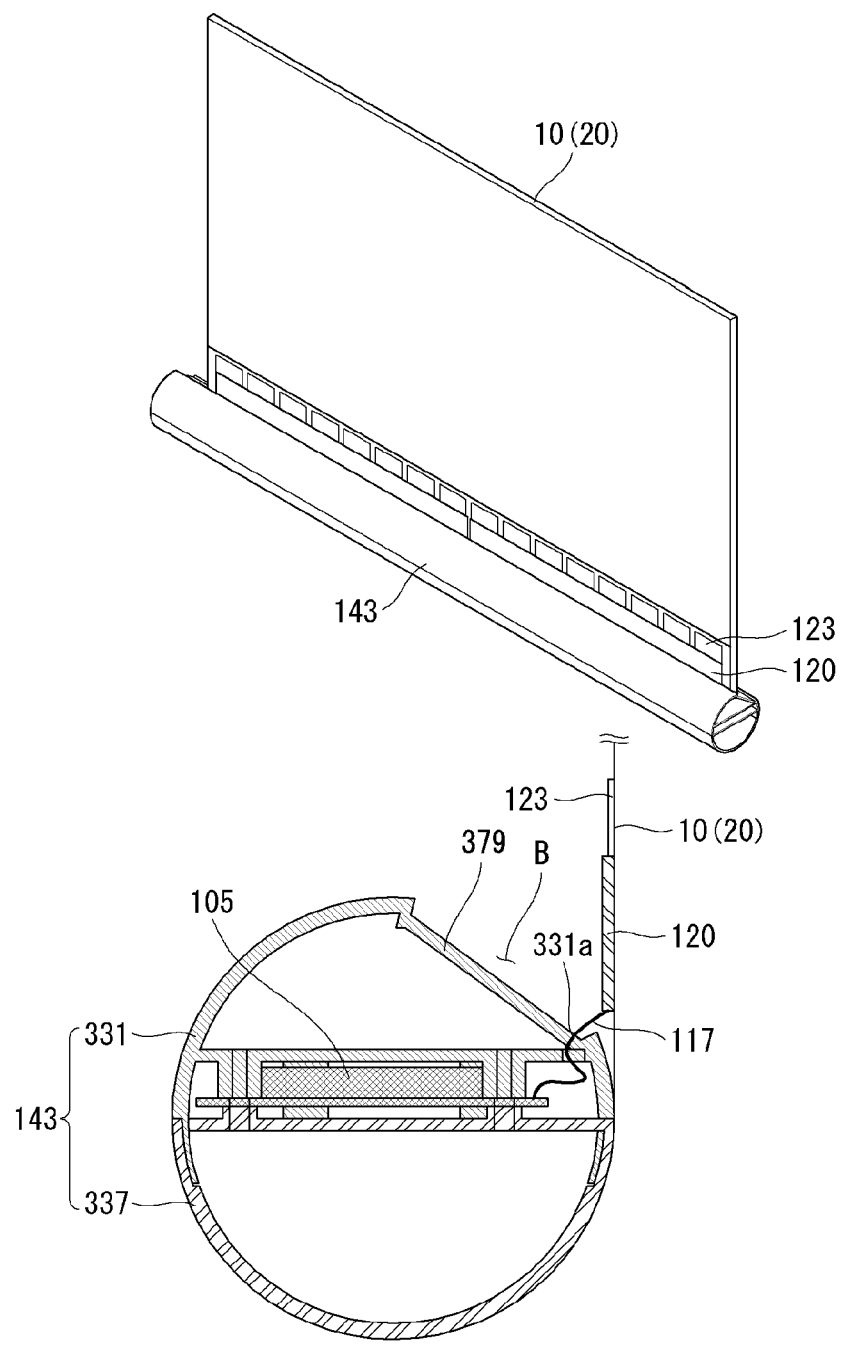

Referring to FIG. 9, the lower end of the display panel 10 may be connected to the roller 143. The display panel 10 may be wound around or unwound from the roller 143.

The front surface of the display panel 10 may be coupled to a plurality of source PCBs 120. The plurality of source PCBs 120 may be spaced apart from each other.

A source chip on film (COF) 123 may connect the display panel 10 and the source PCBs 120. The source COF 123 may be located at the front surface of the display panel 10.

The roller 143 may include a first part 331 and a second part 337. The first part 331 and the second part 337 may be fastened by a screw. A timing controller board 105 may be mounted in the roller 143.

The source PCBs 120 may be electrically connected to the timing controller board 105. The timing controller board 105 may send digital video data and timing control signals to the source PCBs 120.

A cable 117 may electrically connect the source PCBs 120 and the timing controller board 105. For example, the cable 117 may be a flexible flat cable (FFC). The cable 117 may extend through a hole 331a. The hole 331a may be formed in a seating portion 379 or the first part 331. The cable 117 may be located between the display panel 10 and the second part 337.

The seating portion 379 may be formed in an outer circumference of the first part 331. The seating portion 379 may be formed by stepping a portion of the outer circumference of the first part 331. The seating portion 379 may form a space B. When the display unit 20 is wound around the roller 143, the source PCBs 120 may be accommodated in the seating portion 379. Since the source PCBs 120 are accommodated in the seating portion 379, the source PCBs 120 may not be twisted or bent, and durability may be improved.

The cable 117 may electrically connect the timing controller board 105 and the source PCBs 120.

Figure 10:
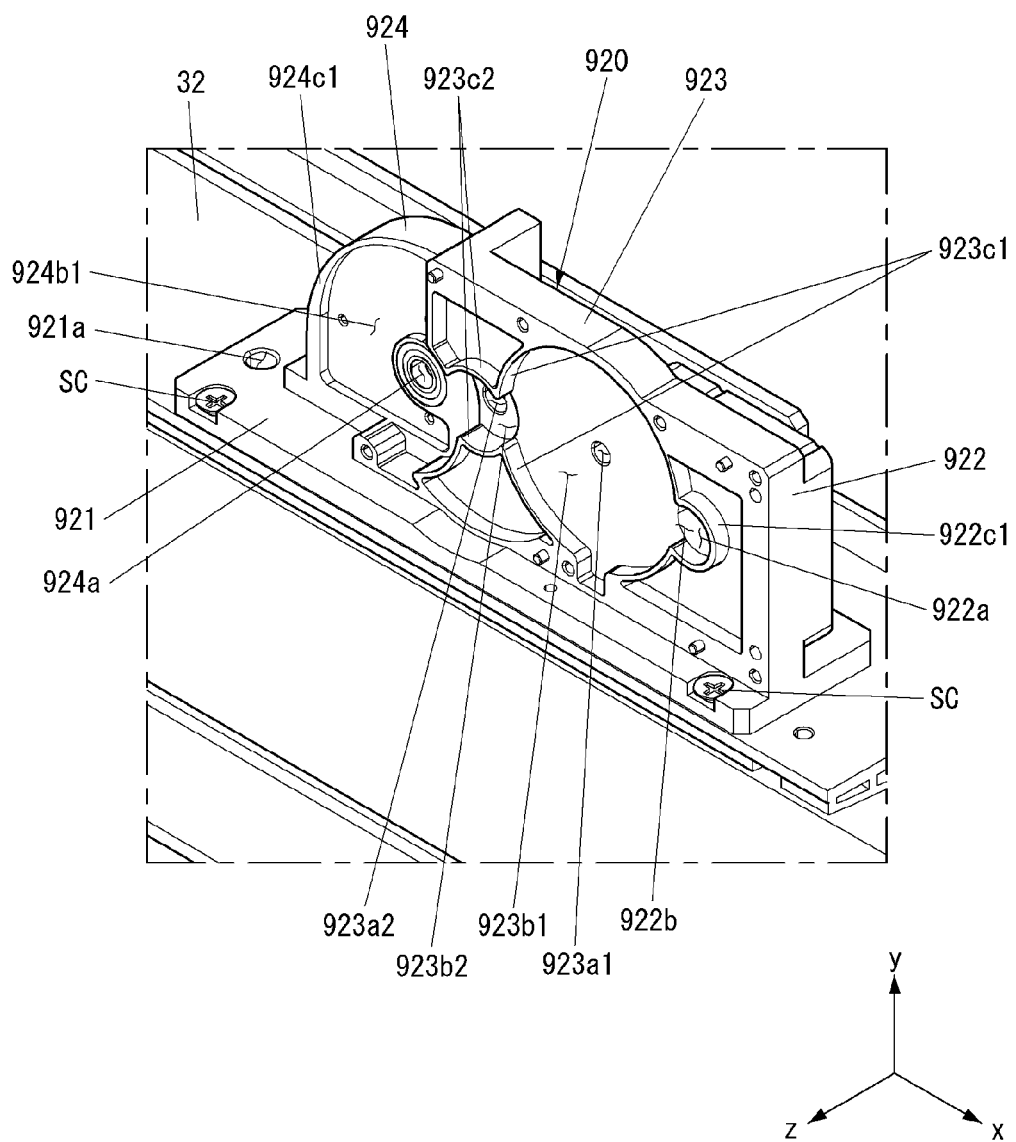

Referring to FIG. 10, a base 32 may be flat. The base 32 may extend long in the x axis direction.

A fastening portion 921 may be installed at the upper surface of the base 32. The fastening portion 921 may be flat. The fastening portion 921 may be fixed to the upper surface of the base 32. The fastening portion 921 may be fastened to the base 32 via a fastening member SC.

A link mount 924 may be formed at the upper surface of the fastening portion 921. The link mount 924 may be formed integrally with the fastening portion 921. The link mount 924 may include a hole 924a. The hole 924a may be formed through the link mount 924 in the z axis direction. The link mount 924 may include a wall 924c1 protruding in the +z axis direction. The wall 924c1 may form a receiving space 924b1. The wall 924c1 may be formed along the circumference of the hole 924a.

A gear mount 923 may be formed at the upper surface of the fastening portion 921. The gear mount 923 may be formed integrally with the fastening portion 921. The gear mount 923 may be located at the right side of the link mount 924. The gear mount 923 may be formed integrally with the link mount 924. The gear mount 923 may include holes 923a1 and 923a2. The holes 923a1 and 923a2 may be formed through the gear mount 923 in the z axis direction. The first hole 923a1 may be located at the right side of the second hole 923a2. The gear mount 923 may include walls 923c1 and 923c2 protruding in the +z axis direction. The first wall 923c1 may form a first receiving space 923b1. The first wall 923c1 may be formed along the circumference of the first hole 923a1. The second wall 923c2 may form a second receiving space 923b2. The second wall 923c2 may be formed along the circumference of the second hole 923a2. The first receiving space 923b1 may be located at the right side of the second receiving space 923b2.

A motor mount 922 may be formed at the upper surface of the fastening portion 921. The motor mount 922 may be formed integrally with the fastening portion 921. The motor mount 922 may be located at the right side of the gear mount 923. The motor mount 922 may be formed integrally with the gear mount 923. The motor mount 922 may include a hole 922a. The hole 922a may be formed through the motor mount 922 in the z axis direction. The motor mount 922 may include a wall 922c1 protruding in the +z axis direction. The wall 922c1 may form a receiving space 922. The wall 922c1 may be formed along the circumference of the hole 922a.

The walls 922c1, 923c1, 923c2, and 924c1 may be connected to each other. The receiving spaces 922b, 923b1, 923b2, and 924b1 may communicate with each other. A hole 921a may be formed in the upper surface of the fastening portion 921. The hole 921a may be formed through the fastening portion 921 in the y axis direction. The hole 921a may be located at the left side of the link mount 924. The hole 921a, the link mount 924, the gear mount 923, and the motor mount 922 may be sequentially located in the x axis direction.

Figure 11:
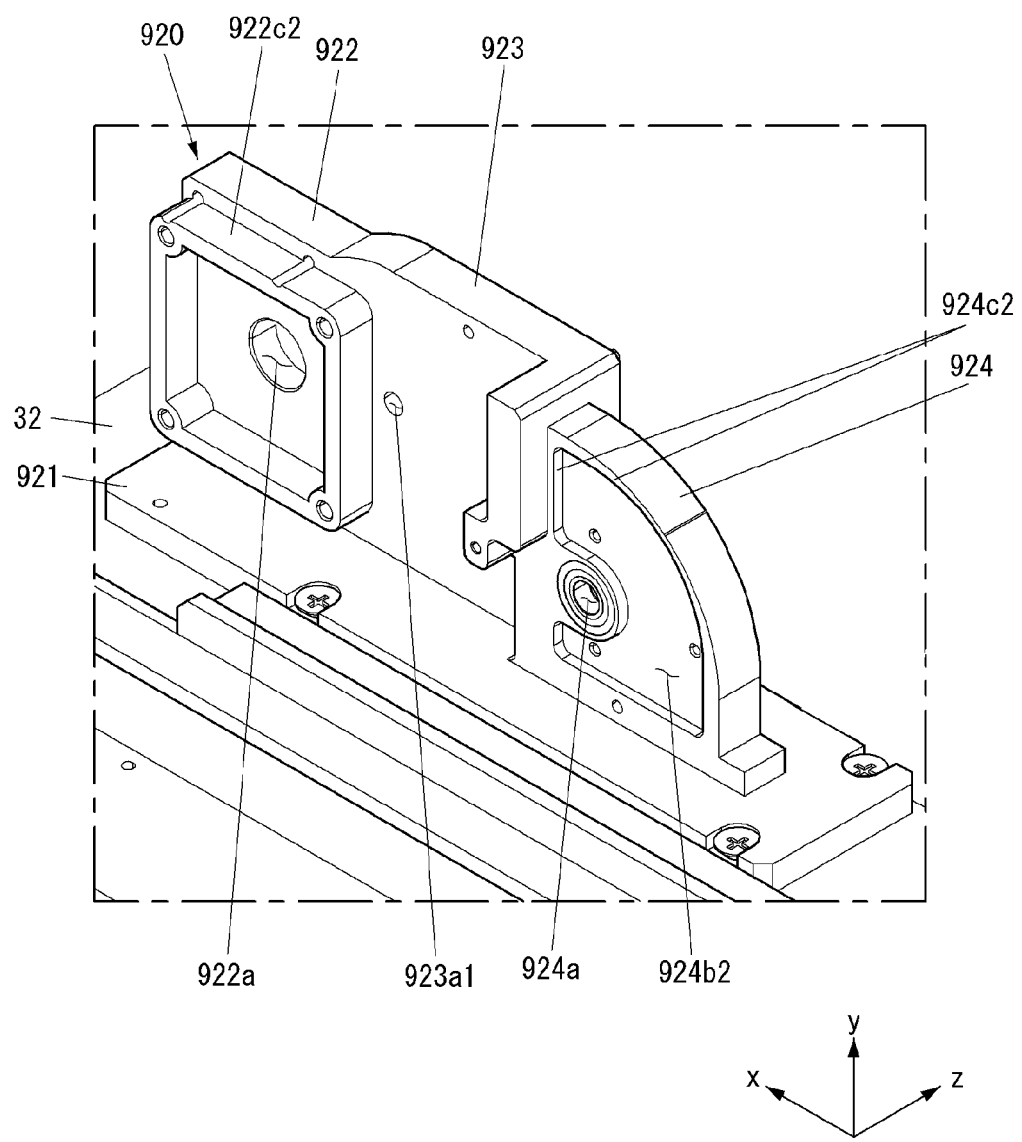

Referring to FIG. 11, the motor mount may include a wall protruding in the −z axis direction. The wall may be formed along the circumference of the hole.

The link mount 924 may include a wall 924c2 protruding in the −z axis direction. The wall 924c2 may form a receiving space 924b2. The wall 924c2 may be formed along the circumference of the hole 924a.

Figure 12:
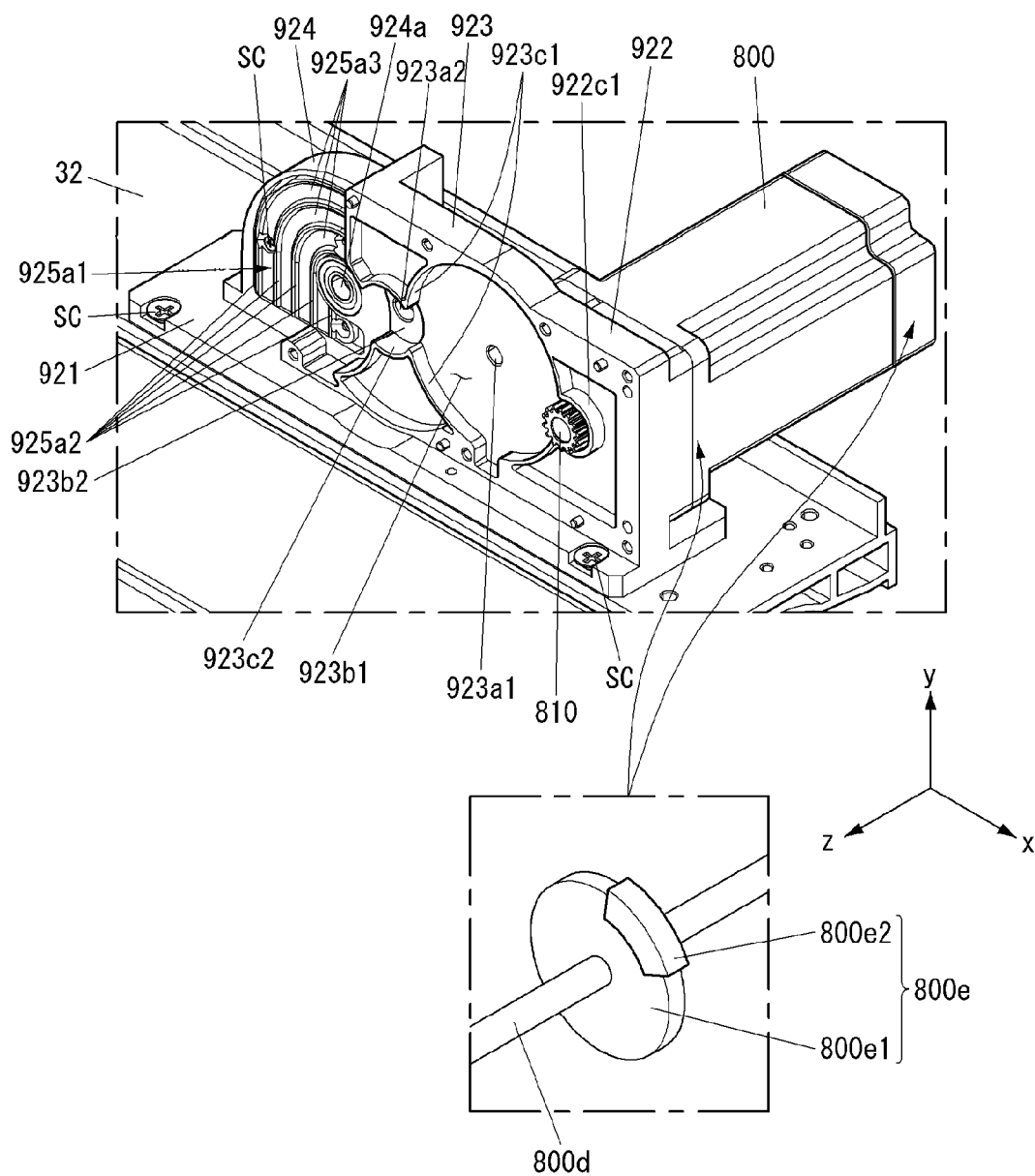

Referring to FIG. 12, a motor 800 may be fastened to the rear surface of the motor mount 922. The motor 800 may be fixed to the motor mount 922. A driving shaft 800d of the motor 800 may be inserted into the hole 922a. The driving shaft 800d may be referred to as a rotary shaft 800d. The driving shaft 800d of the motor 800 may be coupled to a gear 810. The gear 810 may be rotated with the driving shaft 800d when the driving shaft 800d is rotated. The gear 810 may be located in the receiving space 922b. The wall 922c1 may surround the gear 810.

A guide plate 925a1 may be fastened to the front surface of the link mount 924 via a fastening member SC. The guide plate 925a1 may be fixed to the receiving space 924b1. The guide plate 925a1 may include a plurality of guides 925a2. The guide plate 925a1 may include a guide recess 925a3 formed between neighboring guides 925a2. Lubricating oil may be applied to the guide plate 925a1.

A brake 800e may be installed in the motor 800, at the front of the motor 800, or at the rear of the motor 800. In the case in which the brake 800e is installed at the rear of the motor 800, the driving shaft 800d may extend through the motor 800, and the motor 800 may be installed at the driving shaft 800d. The brake 800e may include a disc 800e1 and a caliper 800e2. The disc 800e1 may be coupled to the driving shaft 800d. Alternatively, the disc 800e1 may be formed integrally with the driving shaft 800d. The caliper 800e2 may hold the disc 800e1 to brake the rotation of the disc 800e1. The caliper 800e2 may include a pad configured to come into contact with or be separated from the disc 800e1. The pad generates frictional force to brake the rotation of the disc 800e1 when contacting the disc 800e1.

Figure 13:
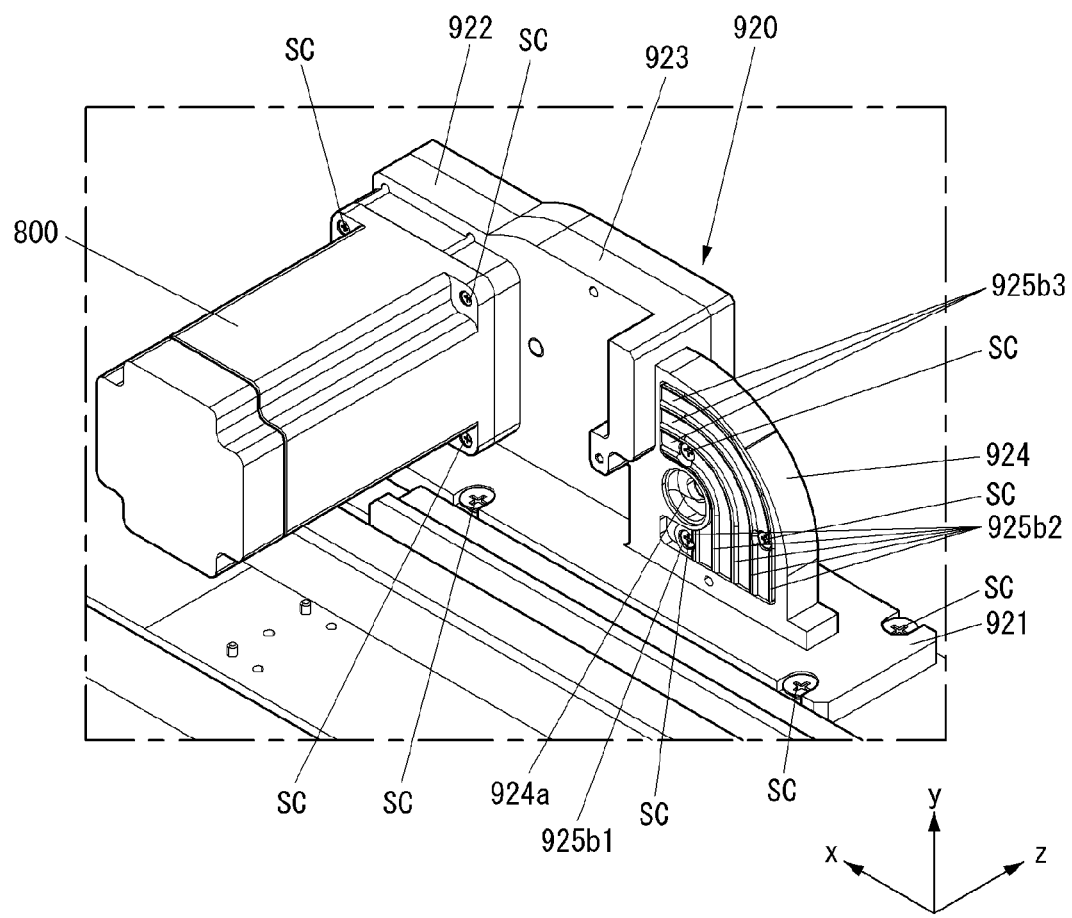

Referring to FIG. 13, the motor 800 may be fastened to a wall 922c2 via a fastening member SC. A guide plate 925b1 may be fastened to the rear surface of the link mount 924 via a fastening member SC. The guide plate 925b1 may be fixed to the receiving space 924b2. The guide plate 925b1 may include a plurality of guides 925b2. The guide plate 925b1 may include a guide recess 925b3 formed between neighboring guides 925b2.

Figure 14:
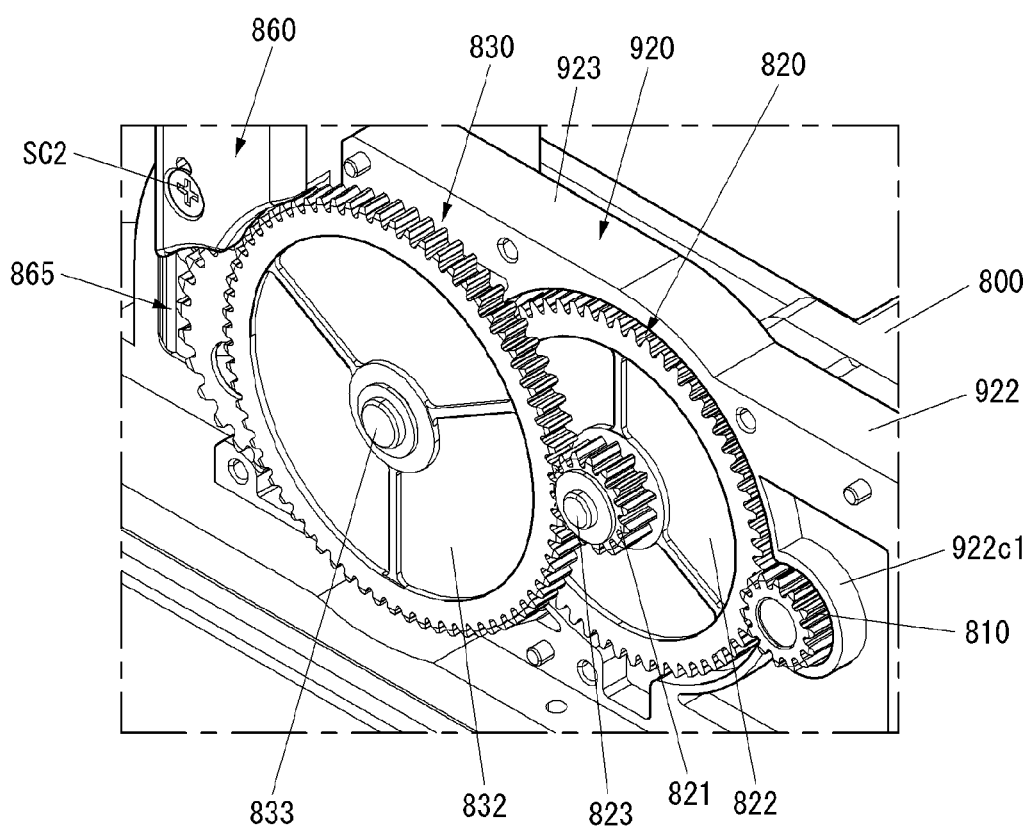

Referring to FIG. 14, gears 810, 820, 830, and 865 may be spur gears. The gear 820 may be installed at the gear mount 923. The gear 820 may be received in the receiving space 923b1. The wall 923c1 may surround the gear 820. A rotary shaft 823 may be inserted into the hole 923a1. The rotary shaft 823 may be rotated relative to the gear mount 923. Alternatively, the rotary shaft 823 may be fixed to the gear mount 923. The gear 820 may be coupled to the rotary shaft 823. The gear 820 may be rotated relative to the rotary shaft 823. Alternatively, the gear 820 may be fixed to the rotary shaft 823. Alternatively, the gear 820 may be formed integrally with the rotary shaft 823. The gear 820 may be a double gear. The gear 820 may include a primary gear 821 and a secondary gear 822. The rotary shaft 823 of the primary gear 821 and the rotary shaft 823 of the secondary gear 822 may be the same. The primary gear 821 and the secondary gear 822 may be integrally formed. The diameter of the secondary gear 822 may be greater than the diameter of the primary gear 821. The number of teeth of the secondary gear 822 may be greater than the number of teeth of the primary gear 821. The secondary gear 822 may be engaged with the gear 810. The secondary gear 822 may be received in the receiving space 923b1. The wall 923c1 may surround the secondary gear 822.

The gear 830 may be installed at the gear mount 923. The gear 830 may be received in the receiving space 923b2. The wall 923c2 may surround the gear 830. A rotary shaft 833 may be inserted into the hole 923a2. The rotary shaft 833 may be rotated relative to the gear mount 923. Alternatively, the rotary shaft 833 may be fixed to the gear mount 923. The gear 830 may be coupled to the rotary shaft 833. The gear 830 may be rotated relative to the rotary shaft 833. Alternatively, the gear 830 may be fixed to the rotary shaft 833. Alternatively, the gear 830 may be formed integrally with the rotary shaft 833. The gear 830 may be a double gear. The gear 830 may include a primary gear 831 (see FIG. 15) and a secondary gear 832. The rotary shaft 833 of the primary gear 831 and the rotary shaft 833 of the secondary gear 832 may be the same. The primary gear 831 and the secondary gear 832 may be integrally formed. The diameter of the secondary gear 832 may be greater than the diameter of the primary gear 831. The number of teeth of the secondary gear 832 may be greater than the number of teeth of the primary gear 831. The secondary gear 832 may be engaged with the gear 820. The secondary gear 832 may be engaged with the primary gear 821. The primary gear 831 may be received in the receiving space 923b2. The wall 923c2 may surround the primary gear 831.

Figure 15:
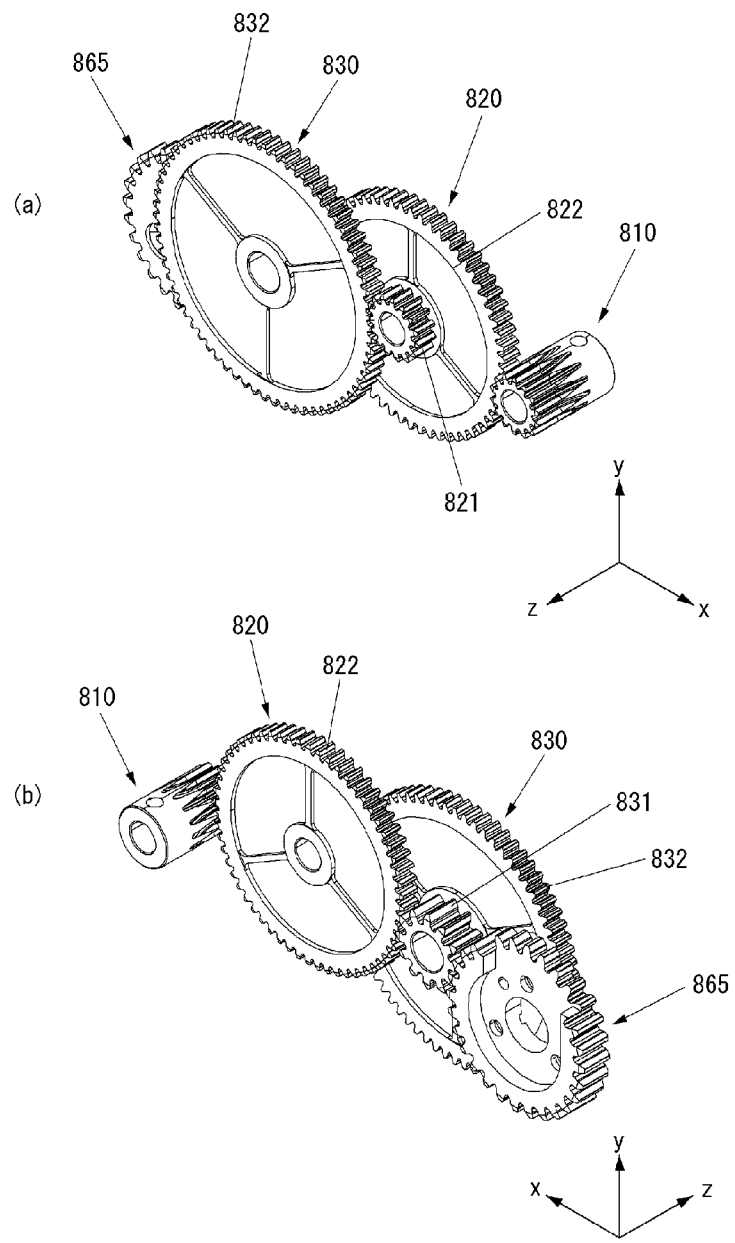

Referring to FIG. 15, torque output from the motor 800 may be transmitted to the fourth gear 965 via the first gear 810, the second gear 820, and the third gear 830. As the torque is transmitted to the fourth gear 965, a link 860 fastened to the fourth gear 965 may be rotated or pivoted.

The first gear 810 may be engaged with the secondary gear 822 of the second gear 820. The number of teeth of the secondary gear 822 may be greater than the number of teeth of the first gear 810. For example, the number of teeth of the first gear 810 may be 14, and the number of teeth of the secondary gear 822 may be 60. The gear reduction ratio (the gear ratio or the reduction ratio) of the secondary gear 822 to the first gear 810 may be 4.29. Alternatively, the gear reduction ratio (the gear ratio or the reduction ratio) of the secondary gear 822 to the first gear 810 may be 3 to 6.

The primary gear 821 of the second gear 820 may be engaged with the secondary gear 832 to the third gear 830. The number of teeth of the secondary gear 832 may be greater than the number of teeth of the primary gear 821. For example, the number of teeth of the primary gear 821 may be 15, and the number of teeth of the secondary gear 832 may be 70. The gear reduction ratio of the secondary gear 832 to the primary gear 821 may be 4.67. Alternatively, the gear reduction ratio of the secondary gear 832 to the primary gear 821 may be 3 to 6.

The primary gear 831 of the third gear 830 may be engaged with the fourth gear 865. The number of teeth of the fourth gear 865 may be greater than the number of teeth of the primary gear 831. For example, the number of teeth of the fourth gear 865 may be 26, and the number of teeth of the primary gear 831 may be 12. The gear reduction ratio of the fourth gear 865 to the primary gear 831 may be 2.17. Alternatively, the gear reduction ratio of the fourth gear 865 to the primary gear 831 may be 1.5 to 3.

The gear reduction ratio of the fourth gear 865 to the first gear 810 may be the product of the gear reduction ratio of the second gear 820 to the first gear 810, the gear reduction ratio of the third gear 830 to the second gear 820, and the gear reduction ratio of the fourth gear 865 to the third gear 830. For example, The gear reduction ratio of the fourth gear 865 to the first gear 810 may be 4.29×4.67×2.17=43.33. The first gear 810 to the fourth gear 865 may amplify torque of the motor 800, thereby rotating or pivoting the link 860.

For example, the diameter of the first gear 810 may be 11.5 mm, the diameter of the primary gear 821 of the second gear 820 may be 11.5 mm, the diameter of the secondary gear 822 of the second gear 820 may be 57.5 mm, the diameter of the primary gear 831 of the third gear 830 may be 14.25 mm, the diameter of the secondary gear 832 of the third gear 830 may be 67.5 mm, and the diameter of the fourth gear 865 may be 39 mm.

For example, the diameter of the first gear 810 may be 14 mm, the diameter of the primary gear 821 of the second gear 820 may be 14 mm, the diameter of the secondary gear 822 of the second gear 820 may be 60 mm, the diameter of the primary gear 831 of the third gear 830 may be 18 mm, the diameter of the secondary gear 832 of the third gear 830 may be 70 mm, and the diameter of the fourth gear 865 may be 42 mm.

For example, the diameter of the first gear 810 may be 16 mm, the diameter of the primary gear 821 of the second gear 820 may be 16 mm, the diameter of the secondary gear 822 of the second gear 820 may be 62 mm, the diameter of the primary gear 831 of the third gear 830 may be 21 mm, the diameter of the secondary gear 832 of the third gear 830 may be 72 mm, and the diameter of the fourth gear 865 may be 45 mm.

Figure 16:
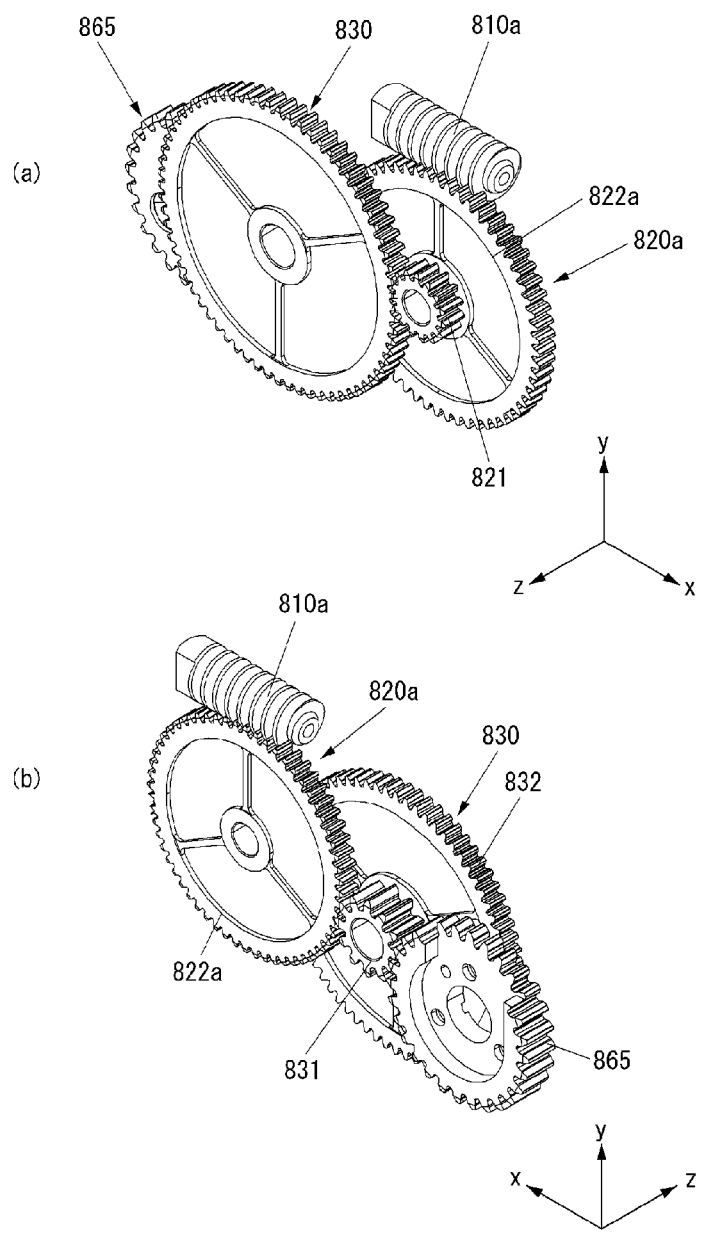

Referring to FIG. 16, a first gear 810a may be a worm gear. A secondary gear 822a of a second gear 820a may be a worm wheel gear. As the worm gear and the worm wheel gear are applied, the gear reduction ratio of to the secondary gear 822a to the first gear 810a may be greatly increased. At this time, the gear reduction ratio may mean the number of revolutions of the first gear 810a while the secondary gear 822a makes one revolution. In the case in which a bevel gear is applied, the motor 800 may be installed in a direction parallel to the x axis.

Figure 17:
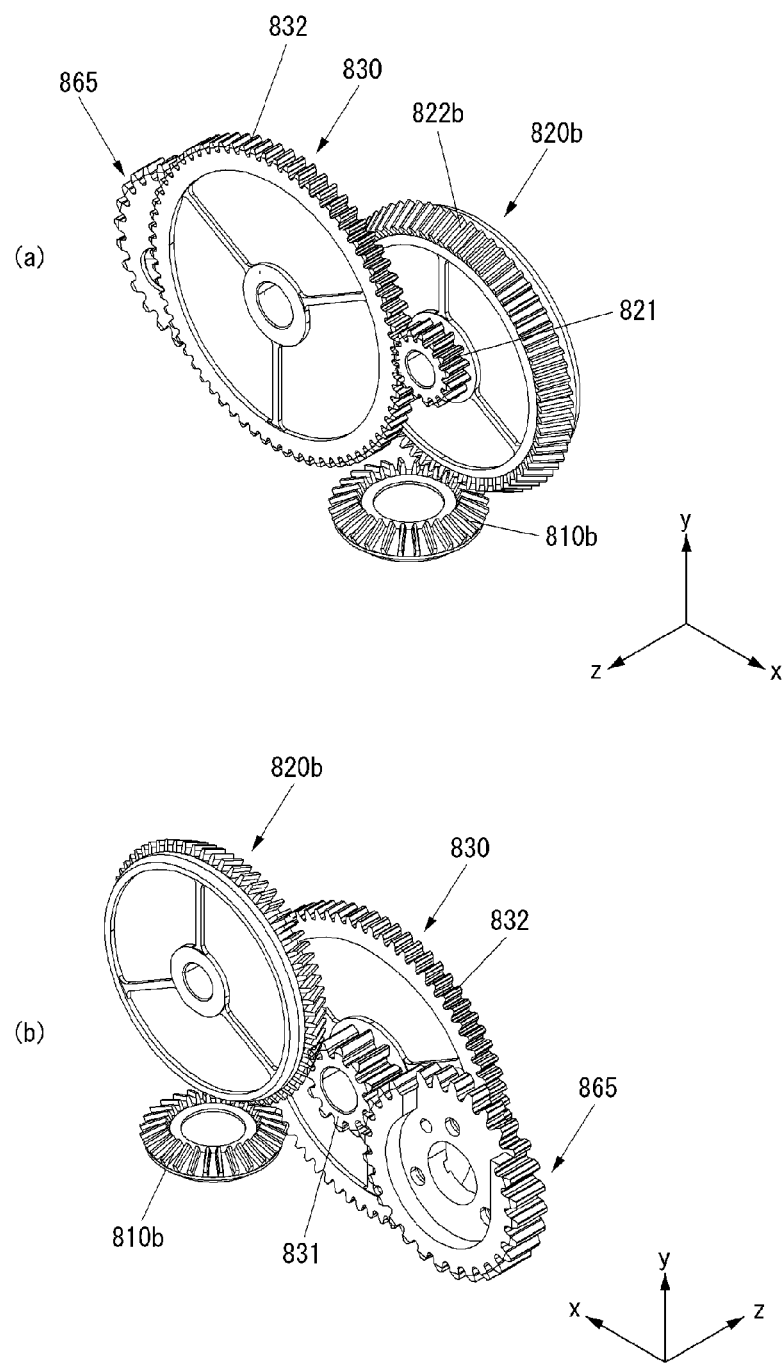

Referring to FIG. 17, a first gear 810b and a secondary gear 822b of a second gear 820b may be bevel gears. In the case in which a worm gear and a worm wheel gear are applied, the motor 800 may be installed in a direction parallel to the x axis.

Figure 18:
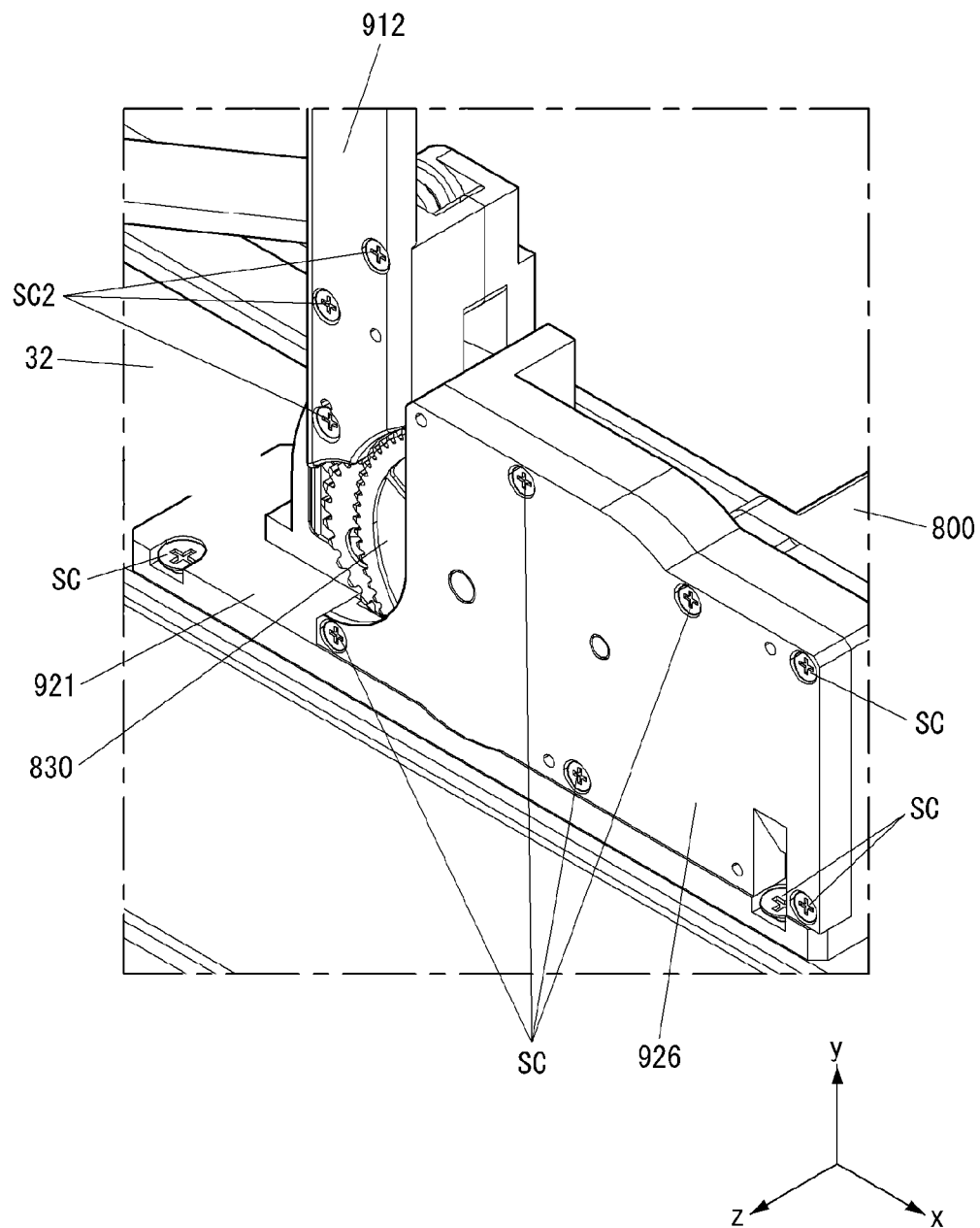

Referring to FIG. 18, a lower link 912 may be fastened to the front surface of the link 860 via a fastening member SC2. The lower link 912 may be fixed to the front surface of the link 860. Alternatively, the lower link 912 and the link 860 may be integrally formed. A cover 926 may be fastened to the front surface of a mount 920 via a fastening member SC. The cover 926 may cover the gears 810, 820, 830, and 885.

Figure 19:
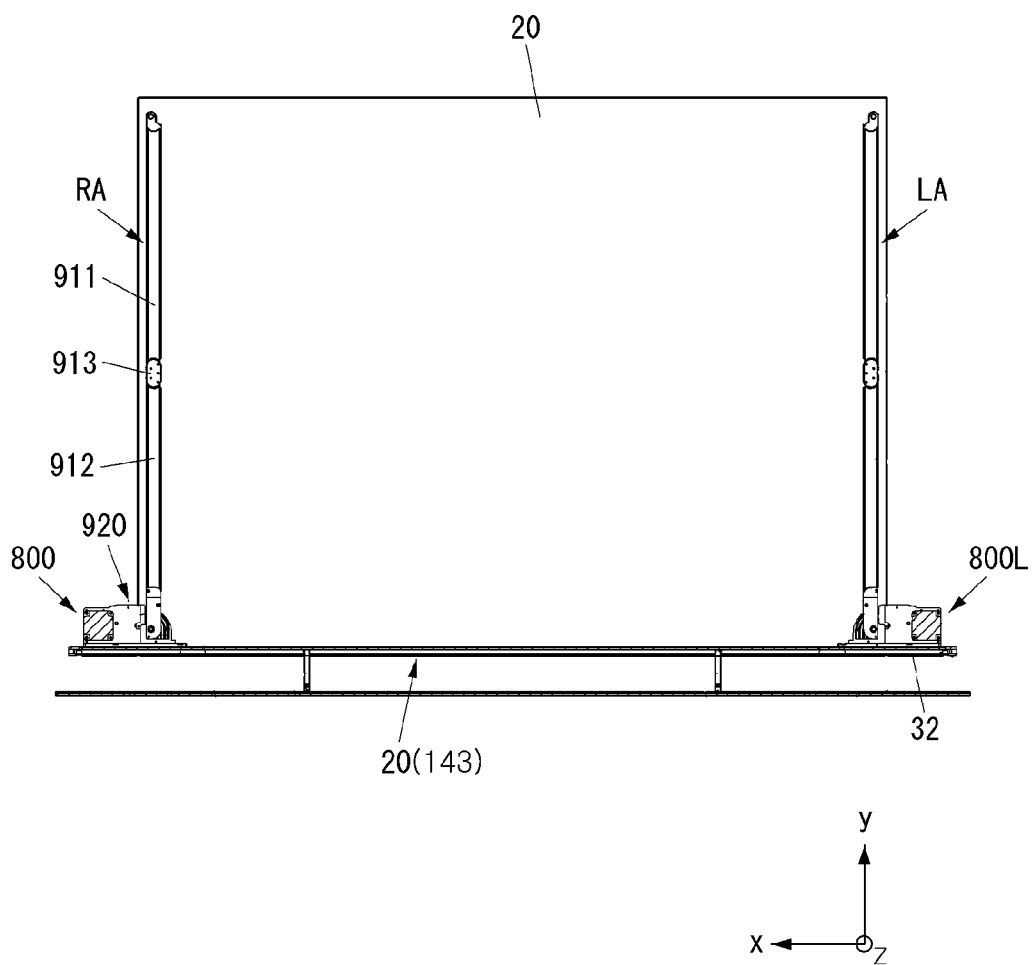

Referring to FIG. 19, a right assembly RA may include a mount 920, a cover 926, a motor 800, gears 810, 820, 830, and 885, or a link 912RL. The link 912RL may include a lower link 912, an upper link 911, or a joint 913. The link 912RL may be referred to as a foldable link 912RL, a lift 912RL, a lift assembly 912RL, a foldable lift 912RL, or a foldable lift assembly 912RL.

A left assembly LA may include the same components as the right assembly RA. The left assembly LA and the right assembly RA may be symmetrical. The left assembly LA may include a mount 920L, a cover 926L, a motor 800L, gears, or a link 912LL. The link 912LL may include a lower link 912L, an upper link 911L, or a joint 913L. The link 912LL may be referred to as a foldable link 912LL, a lift 912LL, a lift assembly 912LL, a foldable lift 912LL, or a foldable lift assembly 912LL. The links 912RL and 912LL may be folded or unfolded.

A first base 31 may be flat. The first base 31 may face a second base 32. The first base 31 may be located under the second base 32. A support 35 may be located between the first base 31 and the second base 32. The support 35 may be fastened to the first base 31 via a fastening member. The support 35 may be fastened to the second base 32 via a fastening member. The roller 143 may be installed at the first base 31. The roller 143 may be located between the first base 31 and the second base 32. A portion of the display unit 20 may be wound around the roller 143, and a portion of the display unit 20 may be unwound from the roller 143. The portion of the display unit 20 unwound from the roller 143 may extend upwards.

Figure 20:
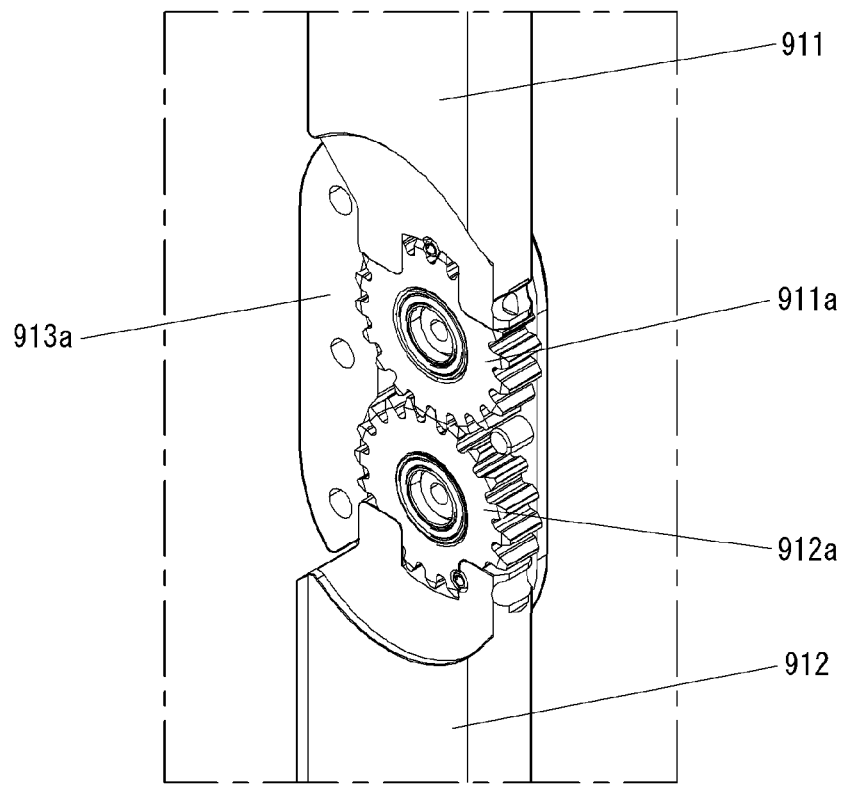

Referring to FIG. 20, a gear 912a may be formed at the upper end of the lower link 912. Alternatively, the gear 912a may be coupled to the upper end of the lower link 912. Alternatively, the gear 912a may be fixed to the upper end of the lower link 912. Alternatively, the gear 912a may be formed integrally with the lower link 912. A gear 911a may be formed at the lower end of the upper link 911. Alternatively, the gear 911a may be coupled to the lower end of the upper link 911. Alternatively, the gear 911a may be fixed to the lower end of the upper link 911. Alternatively, the gear 911a may be formed integrally with the upper link 911. The gears 912a and 911a may be engaged with each other. The gears 911a and 912a may be rotated relative to a first part 913a. The lower link 912 may be referred to as an arm 912.

Figure 21:
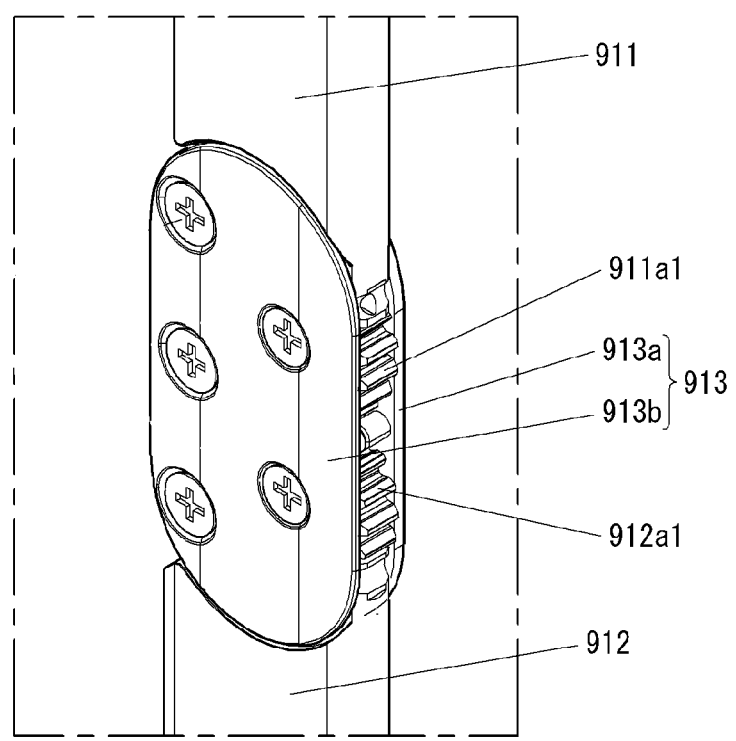

Referring to FIG. 21, a second part 913b may be fastened to the first part 913a via a fastening member SC. The second part 913b may be fixed to the first part 913a. The gears 911a and 912a may be rotated relative to the first part 913a or the second part 913b.

Figure 22:
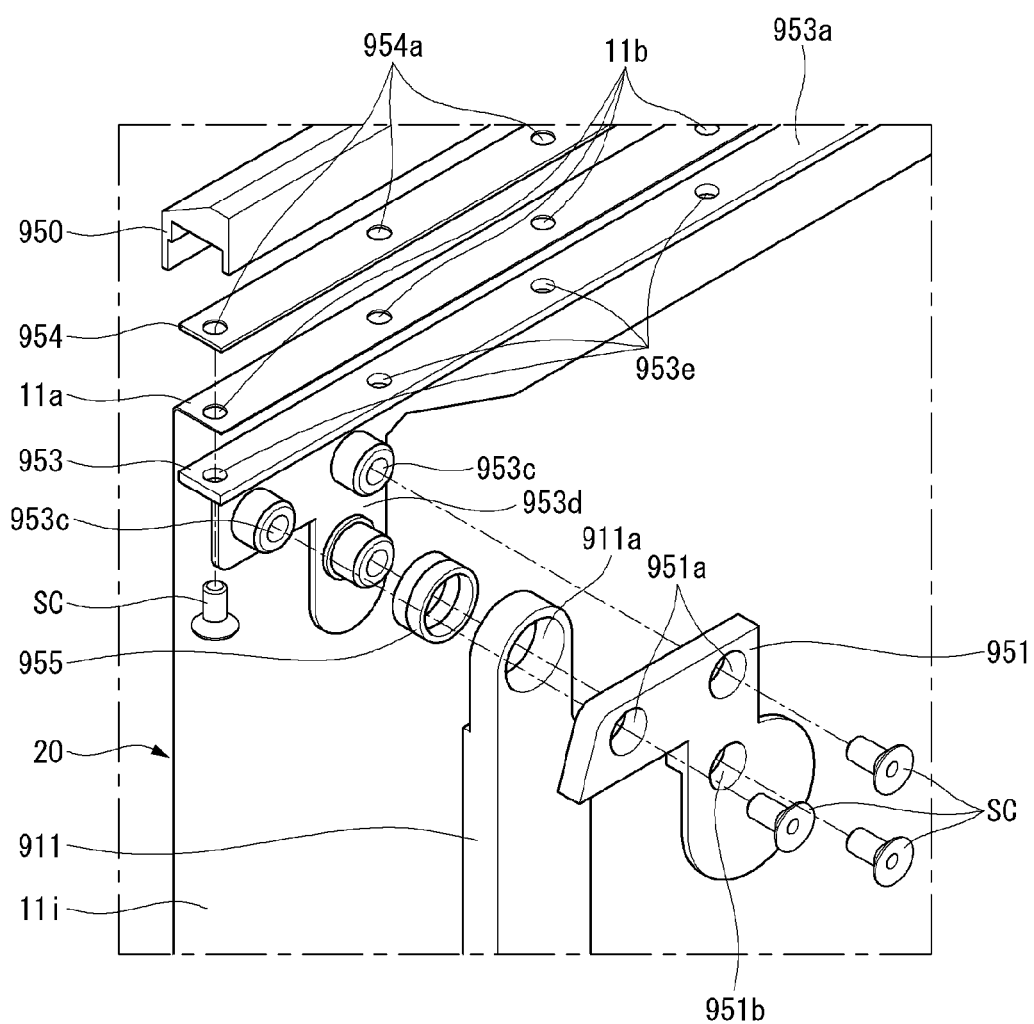

Referring to FIG. 22, the upper part of the display unit 20 may be bent rearwards. The upper part of the display unit 20 may be the portion of the plate 11 that is not coupled to the display panel 10. The upper part of the plate 11 bent rearwards may be referred to as a bending portion 11a or a first part 11a. A portion connected to the bending portion 11a may be referred to as a second part 11i. A top case 950 may be located at the upper side of the bending portion 11a. A gasket 954 may be located between the top case 950 and the bending portion 11a. A lower bar 953 may be located at the lower side of the bending portion 11a. The lower bar 953 may be referred to as a bar 953. The lower bar 953 may include a horizontal portion 953a and a vertical portion 953b. The gasket 954 may include a hole 954a. The bending portion 11a may include a hole 11b. The horizontal portion 953a may include a hole 953e. The hole 954a of the gasket 954, the hole 11b of the bending portion 11a, and the hole 953e of the horizontal portion 953a may face each other. A fastening member SC may be fastened to the top case 950 through the hole 953e of the horizontal portion 953a, the hole 11b of the bending portion 11a, and the hole 954a of the gasket 954. The vertical portion 953b may be located so as to be perpendicular to the horizontal portion 953a. The vertical portion 953b may support the plate 11. The vertical portion 953b may face a link bracket 951. The vertical portion 953b may include a first coupling portion 953c and a second coupling portion 953d protruding rearwards. The second coupling portion 953d may be inserted into a bearing 955. The bearing 955 may be referred to as a ring bearing 955. The bearing 955 may be inserted into a hole 911a of a first arm 911. The link bracket 951 may include a first hole 951a and a second hole 951b. A fastening member SC may extend through the first hole 951a, and may be fastened to the first coupling portion 953c. A fastening member SC may extend through the second hole 951b, and may be fastened to the second coupling portion 953d. The link bracket 951 may be fixed to the lower bar 953 via the first hole 951a, the first coupling portion 953c, and the fastening member SC. The first arm 911 may be pivotably connected to the lower bar 953 via the second coupling portion 953d, the bearing 955, the second hole 951b, and the fastening member SC. In this structure, wrinkles W or rumples W of the display unit 20 may be reduced. The upper link 911 may be rotated or pivoted relative to the second coupling portion 953d or the link bracket 951.

Figure 23:
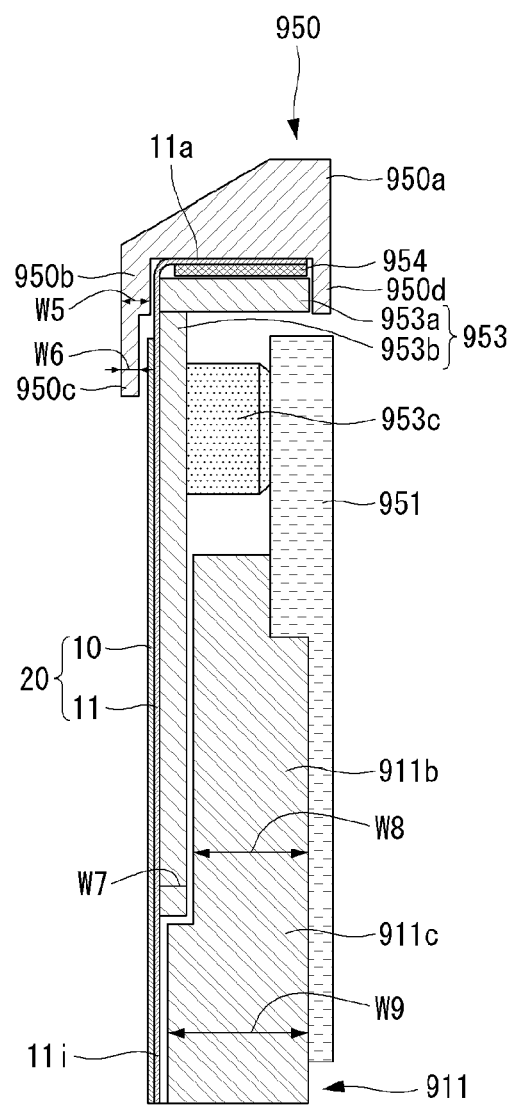

Referring to FIG. 23, a rear wall 950d may extend to the lower side of a first part 950a. The rear wall 950d may be referred to as a second part 950d. The rear wall 950d may cover the bending portion 11a, the gasket 954, or the horizontal portion 953a. A first front wall 950b may extend to the lower side of the first part 950a. The first front wall 950b may be referred to as a third part 950b. The first front wall 950b may cover the upper part of the plate 11 or the second part 11i. A second front wall 950c may extend to the lower side of the first front wall 950b. The second front wall 950c may be referred to as a fourth part 950c. The second front wall 950c may cover the upper part of the display panel 10. The second front wall 950c may cover wrinkles W or rumples W that may be generated at the upper part of the display panel 10. The thickness W5 of the first front wall 950b may be greater than the thickness W6 of the second front wall 950c. The thickness W5 of the first front wall 950b may be substantially equal to the sum of the thickness W6 of the second front wall 950c and the thickness of the display panel 10.

The first arm 911 may include a first part 911b that faces the vertical portion 953b and a second part 911c that faces the plate 11. The thickness W9 of the second part 911c may be substantially equal to the sum of the thickness W7 of the vertical portion 953b and the thickness W8 of the first part 911b. The second part 911c is in contact with or adjacent to the display unit 20, whereby the display unit 20 may be stably supported.

Figure 24:
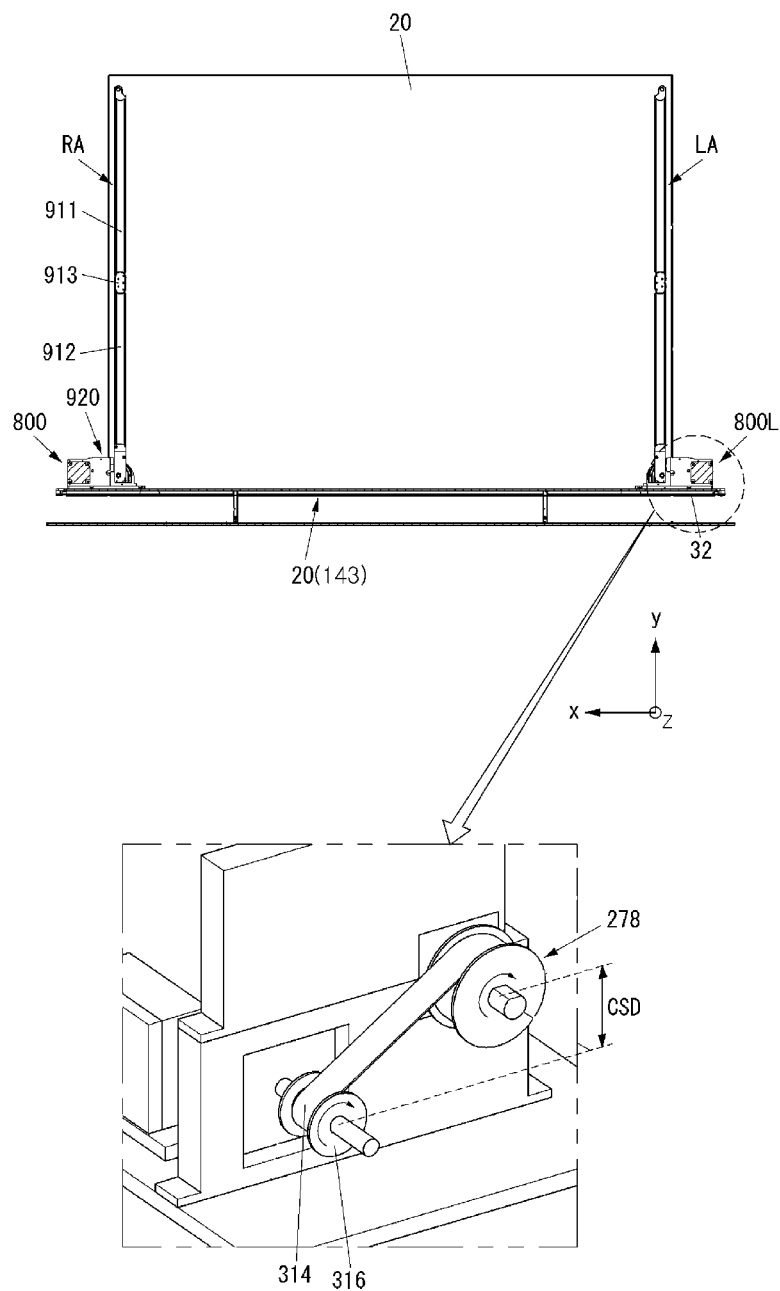

Referring to FIG. 24, the roller 143 may be installed at a mount 36. The mount 36 may be installed at the base 31. The mount 36 may be installed at one end and the other end of the roller 143 in the longitudinal direction (x axis direction). The roller 143 may be installed between mounts 36. The roller 143 may be rotated relative to the mount 36. A hub 278 may be installed at the mount 36. The mount 36 may be located between the roller 143 and the hub 278. The hub 278 may be coupled or fixed to one end of the roller 143. The hub 278 may be formed integrally with the roller 143. As the roller 143 is rotated, the hub 278 may be rotated. The rotational speed of the roller 143 may be equal to the rotational speed of the hub 278.

A rotary shaft 315 may be installed at the mount 36. The rotary shaft 315 may be rotated relative to the mount 36. A spring 314 may be wound around the rotary shaft 315. The spring 314 may be a constant force spring. The spring 314 may be wound around the rotary shaft 315 a plurality of times. One end of the spring 314 may be fixed to the rotary shaft 315. The other end of the spring 314 may be fixed to the hub 278. The spring 314 may extend towards the hub 278, and may be wound around or unwound from the circumference of the hub 278. The spring 314 may be wound around or unwound from the rotary shaft 315, and may provide restoring force to the hub 278. The restoring force may be formed by which the spring 314 is wound around the rotary shaft 315. A guide 316 may guide winding or unwinding of the spring 314 around or from the rotary shaft 315. When the spring 314 is wound around or unwound from the rotary shaft 315, the rotational direction of the rotary shaft 315 and the rotational direction of the hub 278 may be the same.

The rotary shaft 315 may be located lower than the hub 278 by a distance CSD in the y axis direction. In the case in which the rotary shaft 315 is located lower than the hub 278, greater force may be transmitted to the hub 278 than in the case in which the rotary shaft 315 is located level with or higher than the hub 278. Due to restoring force that the spring 314 provides to the hub 278, the display unit 20 may be wound around the roller 143.

Figure 25:
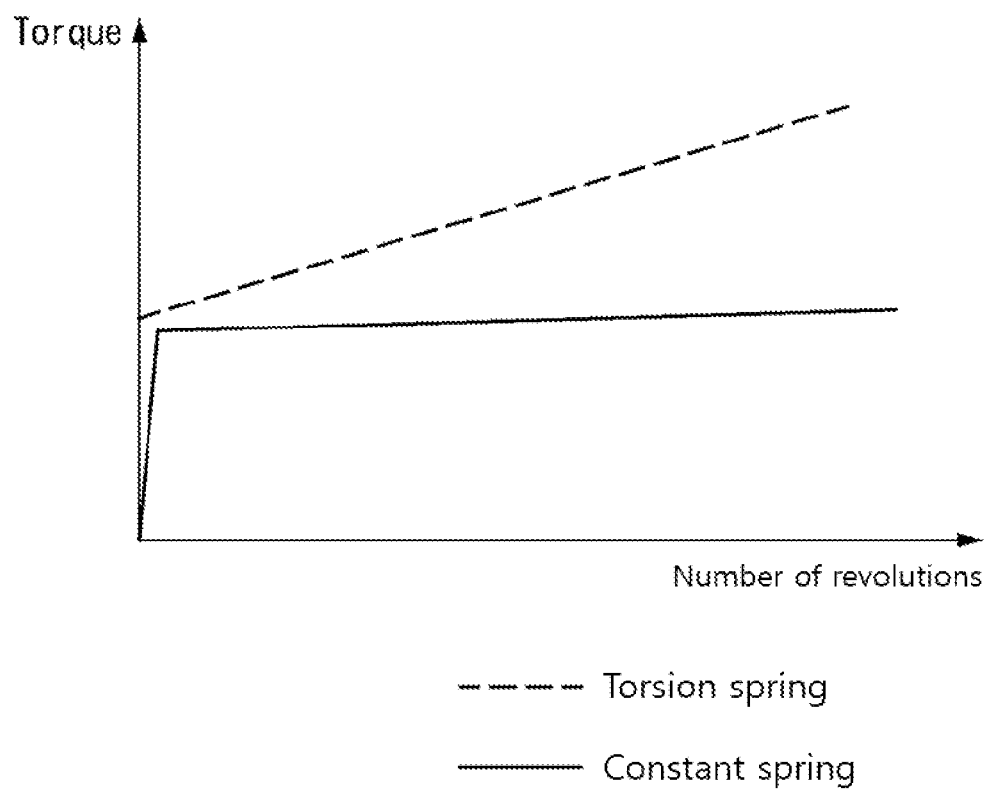

Referring to FIG. 25, in the case of a conventional torsion spring, torque applied thereto may be increased as the number of revolutions is increased, as shown by a dotted line. In the case of the spring 314, torque applied thereto may be uniform when the number of revolutions exceeds a predetermined value, as shown by a solid line. Variation in torque necessary to wind the display unit 20 around the roller 143 may not be great, compared to the number of times that the display unit 20 is wound around the roller 143. In the case in which the constant force spring is applied to acquire uniform torque, therefore, it is possible to stably drive the roller 143.

Figure 26:
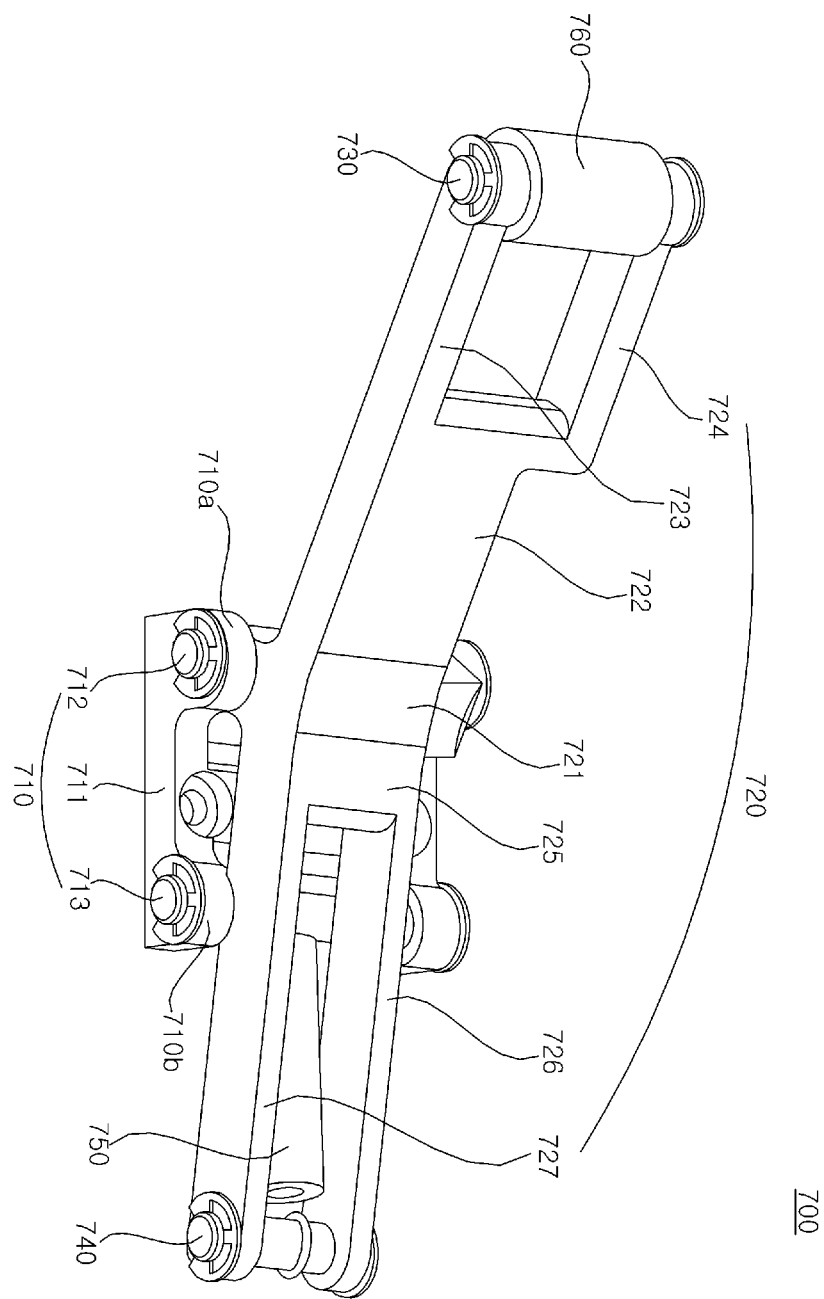

Referring to FIG. 26, a fulcrum 710 may include a lever base 711, a first support 712, and a second support 713. The lever base 711 may be mounted on the base 32 (see FIG. 12). The lever base 711 may have a first support mount 710a and a second support mount 710b. The first support mount 710a may protrude toward the upper side of the lever base 711, and may have an axial hole. The second support mount 710b may protrude toward the upper side of the lever base 711, and may have an axial hole spaced apart from the first support mount 710a in the state of being parallel thereto.

The first support 712 may be inserted into the first support mount 710a. The first support 712 may be referred to as a first support shaft 712. The second support 713 may be inserted into the second support mount 710b. The second support 713 may be referred to as a second support shaft 713. The height of the first support mount 710a may be greater than the height of the second support mount 710b. That is, this means that the position of the first support 712 may be higher than the position of the second support 713 with respect to the lever base 711.

A lever 720 may include a center 721, a first bar 722, a second bar 725, a first fork 723 and 724, and a second fork 726 and 727. The lever 720 may be generally bent in the form of V. The center 721 may be pivotably coupled to the first support 712. The first bar 722 may extend long from one side of the center 721, and the second bar 725 may extend long from the other side of the center 721. The first bar 722 may be opposite the second bar 725 with respect to the center 721. The length of the first bar 722 may be greater than the length of the second bar 725.

The first fork 723 and 724 may be formed so as to extend long from the first bar 722 in a direction far away from the center 721. For example, the first fork 723 and 724 may have two blades 723 and 724. The second fork 726 and 727 may be formed so as to extend long from the second bar 725 in a direction far away from the center 721. For example, the second fork 726 and 727 may have two blades 726 and 727. The length of the blades 726 and 727 of the second fork may be greater than the length of the blades 723 and 724 of the first fork. The distance between the blades 726 and 727 of the second fork may be less than the distance between the blades 723 and 724 of the first fork.

A roller shaft 730 may be inserted into the distal ends of the blades 723 and 724 of the first fork. A roller 760 may be fitted on the roller shaft 730. For example, the roller 760 may include a urethane material. A holder shaft 740 may be inserted into the distal ends of the blades 726 and 727 of the second fork. One end of a spring 750 may be caught by the second support 713, and the other end of the spring 750 may be caught by the holder shaft 740. For example, the spring 750 may be an extension spring.

Figure 27:
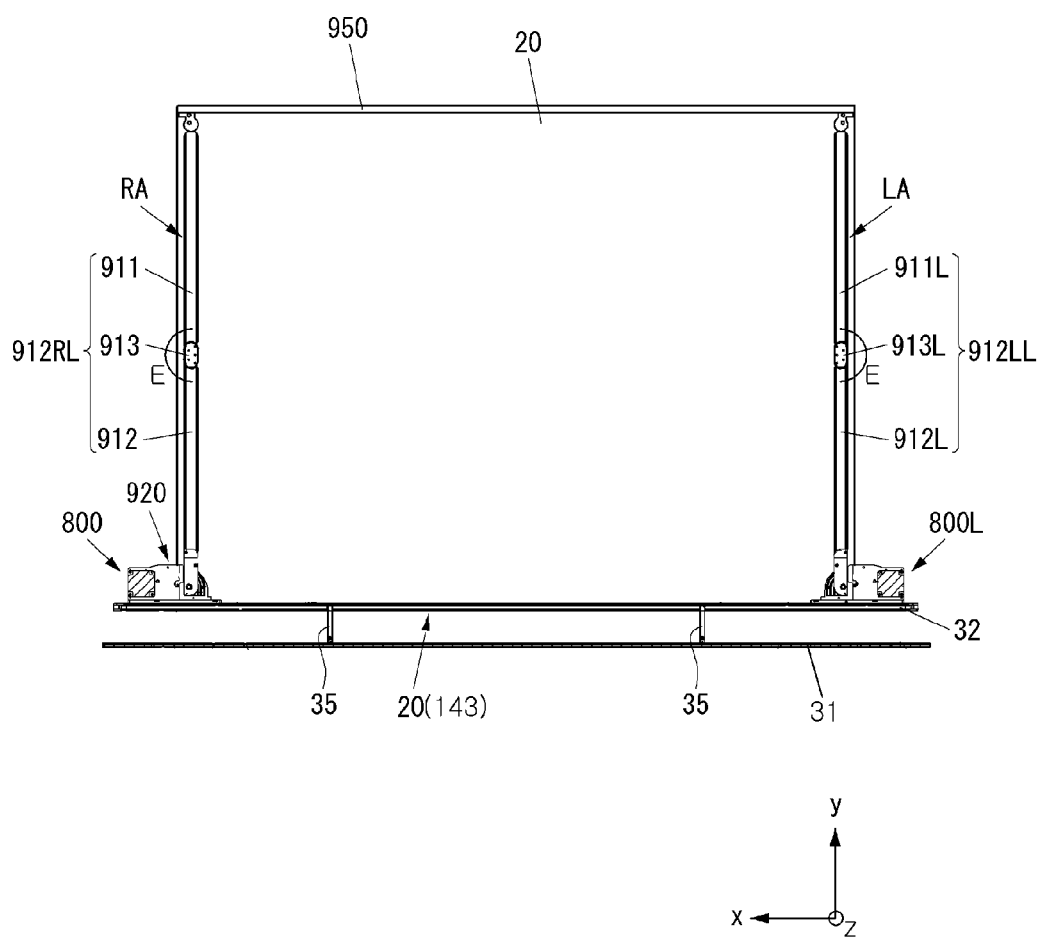
Figure 28:
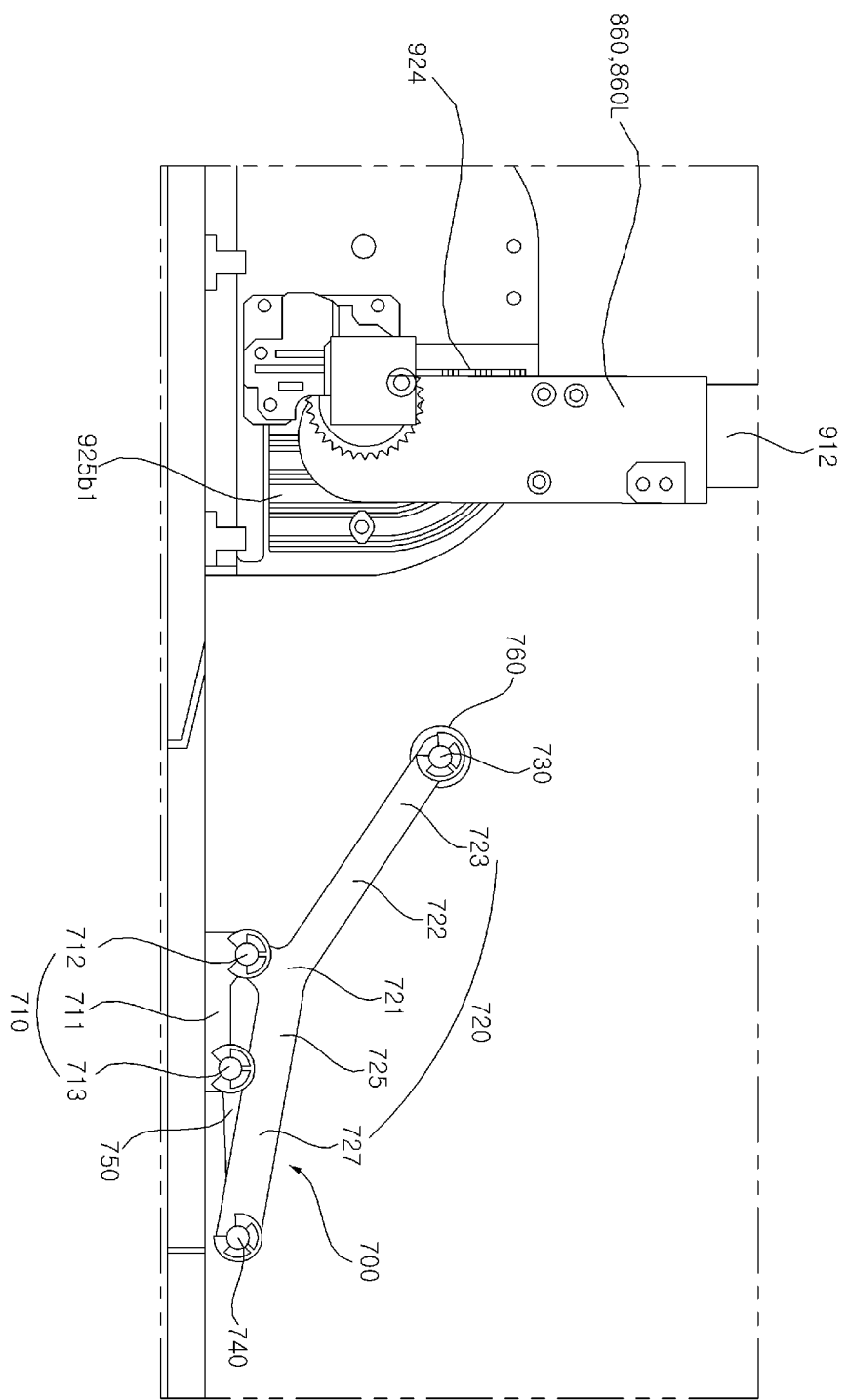

Referring to FIGS. 27 and 28, the height of the top case 950 in the y axis direction may be the maximum. In the case in which the height of the top case 950 in the y axis direction is the maximum, the angle E formed by the lower links 912 and 912L and the upper links 911 and 911L may be the maximum. For example, the angle E may be 180 degrees. In the case in which the height of the top case 950 in the y axis direction is the maximum, the display unit 20 may be in the state of being maximally unwound from the roller 143. In the case in which the height of the top case 950 in the y axis direction is the maximum, the roller 760 of the lever 700 may not contact the links 860 and 860L.

Figure 29:
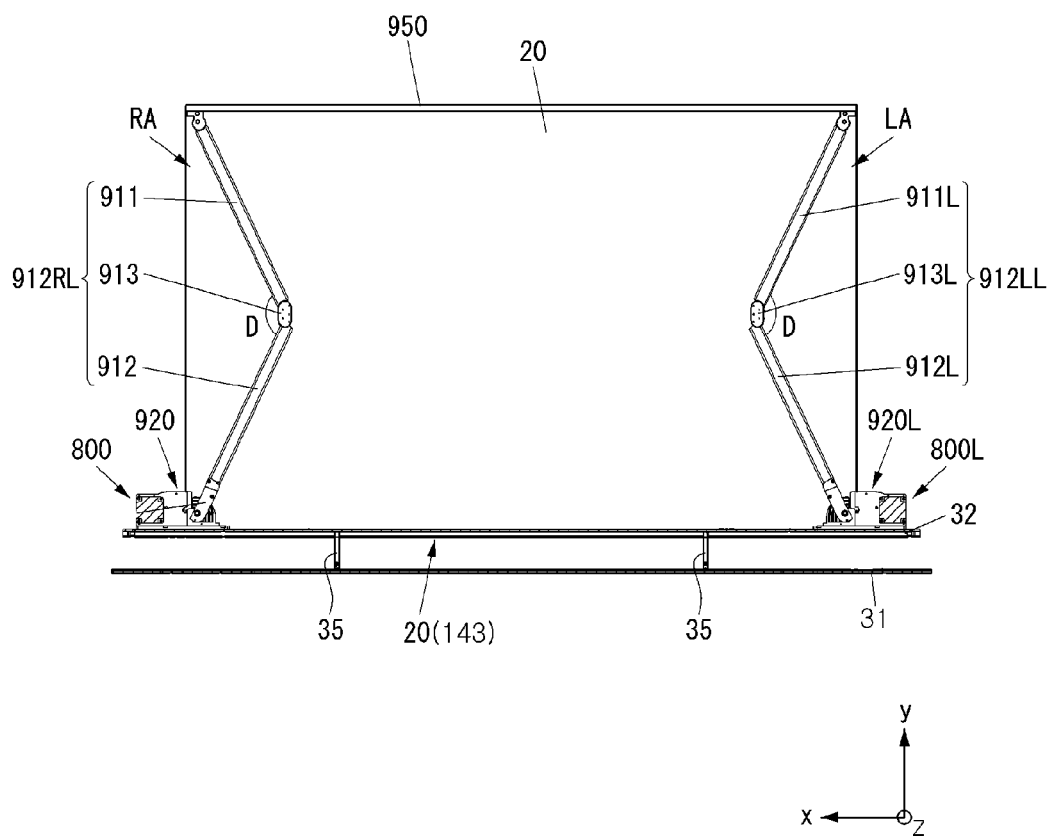

Referring to FIG. 29, the motors 800 and 800L may rotate or pivot the lower links 912 and 912L.

As the motors 800 and 800L rotate or pivot the lower links 912 and 912L in the direction in which the lower link is erected relative to the base 32, the angle D formed by the lower links 912 and 912L and the upper links 911 and 911L may increase. As the motors 800 and 800L rotate or pivot the lower links 912 and 912L in the direction in which the lower link is erected relative to the base 32, the angle formed by the lower links 912 and 912L and the base 32L may increase. As the motors 800 and 800L rotate or pivot the lower links 912 and 912L in the direction in which the lower link is erected relative to the base 32, the top case 950 may move in the +y axis direction. As the motors 800 and 800L rotate or pivot the lower links 912 and 912L in the direction in which the lower link is erected relative to the base 32, the display unit may be unwound from the roller.

As the motors 800 and 800L rotate or pivot the lower links 912 and 912L in the direction opposite the direction in which the lower link is erected relative to the base 32, the angle D formed by the lower links 912 and 912L and the upper links 911 and 911L may decrease. As the motors 800 and 800L rotate or pivot the lower links 912 and 912L in the direction opposite the direction in which the lower link is erected relative to the base 32, the angle D formed by the lower links 912 and 912L and the base 32L may increase. As the motors 800 and 800L rotate or pivot the lower links 912 and 912L in the direction opposite the direction in which the lower link is erected relative to the base 32, the top case 950 may move in the −y axis direction. As the motors 800 and 800L rotate or pivot the lower links 912 and 912L in the direction opposite the direction in which the lower link is erected relative to the base 32, the display unit may be wound around the roller.

As the lower links 912 and 912L are rotated or pivoted in the direction in which the lower link is erected, the distance between the joints 913 and 913L may increase. As the lower links 912 and 912L are rotated or pivoted in the direction opposite the direction in which the lower link is erected, the distance between the joints 913 and 913L may decrease.

Figure 30:
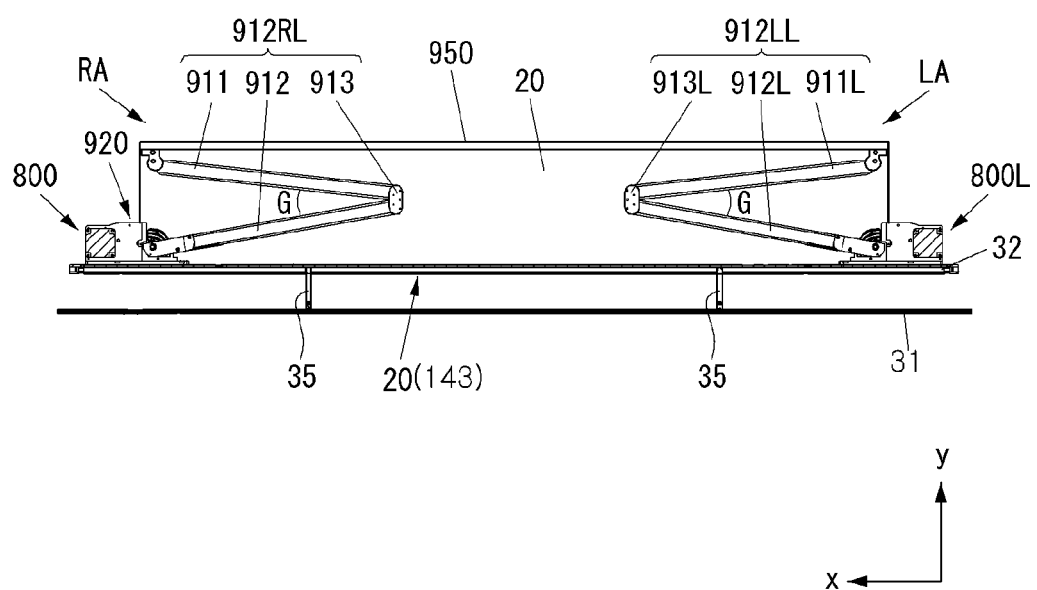
Figure 31:
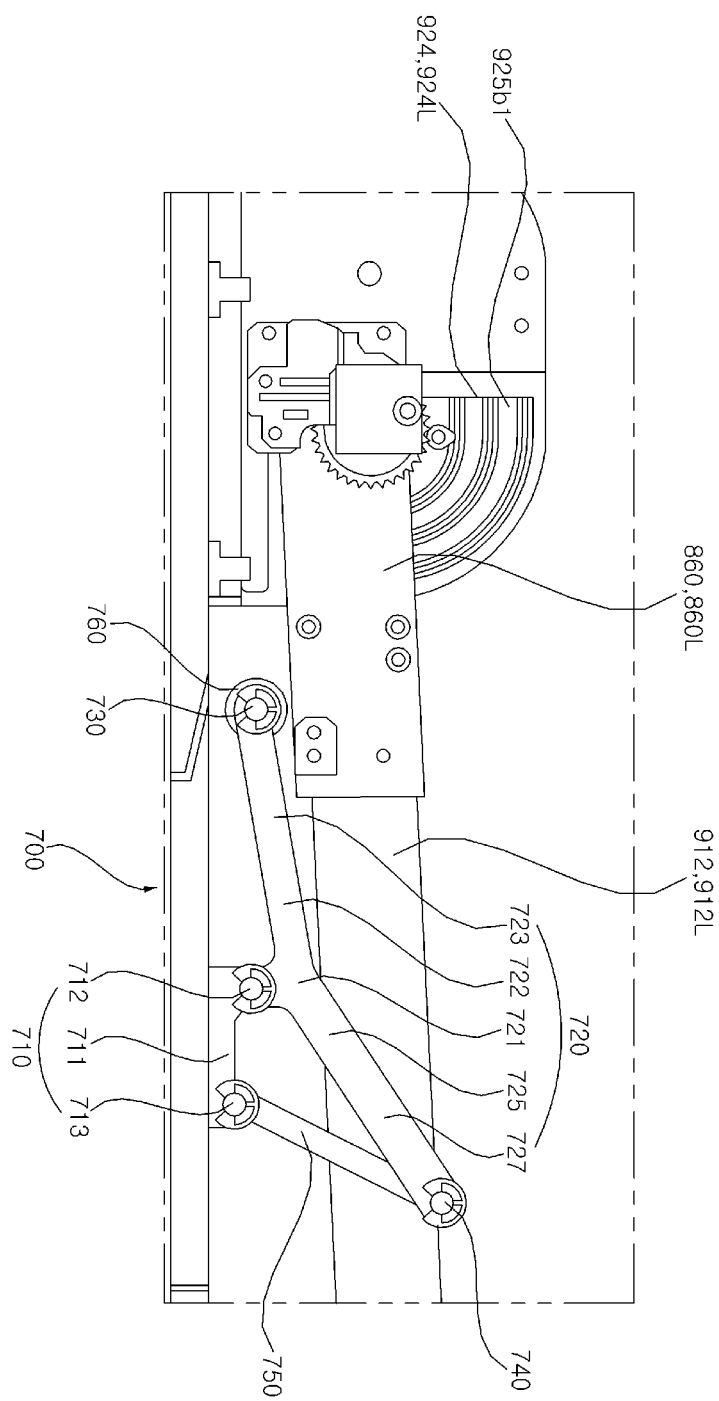

Referring to FIGS. 30 and 31, the height of the top case 950 in they axis direction may be the minimum. In the case in which the height of the top case 950 in the y axis direction is the minimum, the angle G formed by the lower links 912 and 912L and the upper links 911 and 911L may be the minimum. In the case in which the height of the top case 950 in the y axis direction is the minimum, the display unit 20 may be in the state of being maximally wound around the roller 143. In the case in which the height of the top case 950 in they axis direction is the minimum, the roller 760 of the lever 700 may contact the links 860 and 860L. As the height of the top case 950 in they axis direction decreases, the links 860 and 860L may push the roller 760 of the lever 700, the lever 700 may be pivoted about the first support 712. As the lever 720 is rotated or pivoted about the first support 712, the height of the roller 760 of the lever 700 may decrease, and the height of the holder shaft 740 of the lever 720 may increase.

For example, a change may be made from the state in which the height of the roller 760 of the lever 700 is greater than the height of the holder shaft 740 of the lever 720 to the state in which the height of the roller 760 of the lever 700 is less than the height of the holder shaft 740 of the lever 720. As a result, the length of the spring 750 may increase, and the lever 720 may provide the links 860 and 860L with force by which the height of the roller 760 of the lever 700 is restored to the state in which the height of the roller 760 of the lever 700 is greater than the height of the holder shaft 740 of the lever 720.

Consequently, the lever 720 may provide erecting force to the links 860 and 860L at the time of initial driving (erecting operation) of the links 860 and 860L, and may provide damping force to the links 860 and 860L at the time of final driving (folding operation) of the links 860 and 860L.

Figure 32:
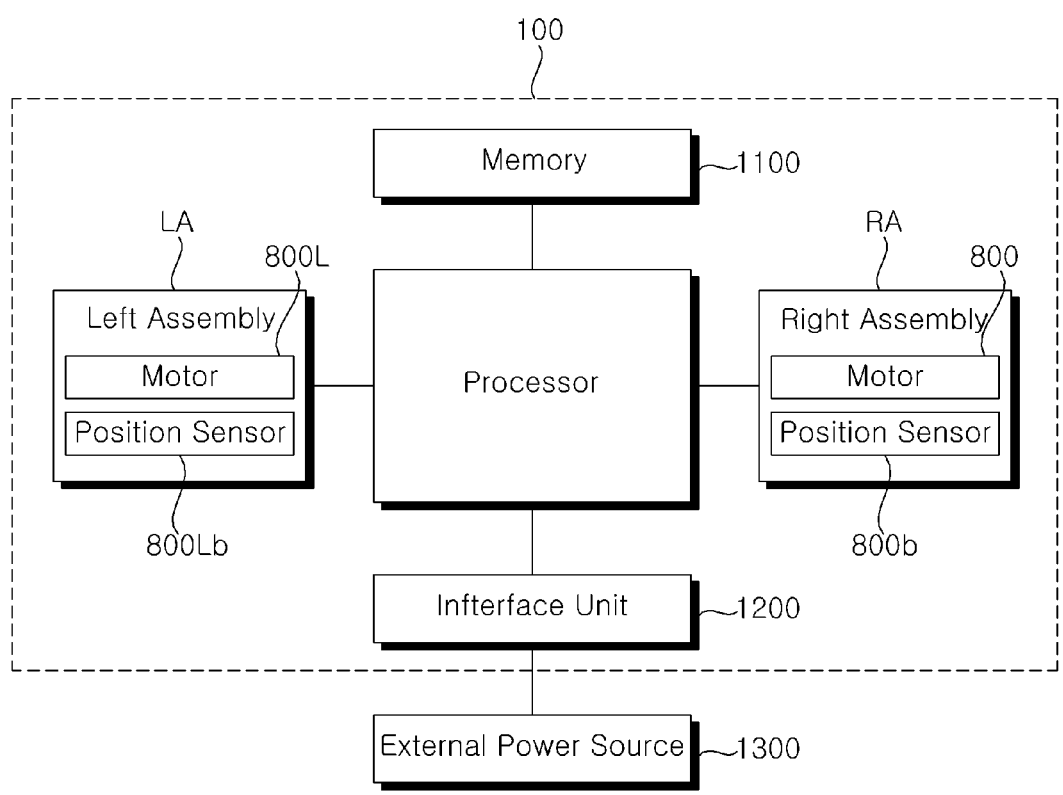

Referring to FIG. 32, the display device 100 may include an interface unit 1200 connected to an external device. The interface unit 1200 may be connected to an external power source 1300, and may receive power from the external power source 1300. A processor 1000 may distribute power to respective components. The processor 1000 may be referred to as a control unit 1000 or a controller 1000.

A memory 1100 may store various data necessary to operate the display device 100, such as programs for processing or control of the processor 1000. The memory 1100 may store various application programs or applications driven in the display device 100.

The processor 1000 may control the operation of the left assembly LA and the right assembly RA. Driving of the left assembly LA and the driving of the right assembly RA must be performed in a symmetrical fashion such that the display unit 20 is smoothly wound around or unwound from the roller 143.

The processor 1000 may simultaneously control the motors 800 and 800L. The processor 1000 may control the rotational amounts, rotational speeds, or rotational directions of the driving shafts 800d and 800Ld of the motors 800 and 800L. The processor 1000 may perform control such that the rotational directions of the driving shafts 800d and 800Ld of the motors 800 and 800L are opposite each other. The processor 1000 may perform control such that the rotational speeds of the driving shafts 800d and 800Ld of the motors 800 and 800L are the same. The processor 1000 may perform control such that the rotational amounts of the driving shafts 800d and 800Ld of the motors 800 and 800L are the same. As control is performed such that the rotational amounts or the rotational speeds of the driving shafts 800d and 800Ld of the motors 800 and 800L are the same, the rotational amounts or pivoting amounts of the links 911 and 911L may be the same. As control is performed such that the rotational amounts or the rotational speeds of the driving shafts 800d and 800Ld of the motors 800 and 800L are the same, the links 911 and 911L may be operated in a symmetrical fashion. As control is performed such that the rotational amounts or the rotational speeds of the driving shafts 800d and 800Ld of the motors 800 and 800L are the same, the top case 950 may move upwards and downwards in the y axis direction while remaining horizontal.

The processor 1000 may sense the rotational amount, rotational speed, or rotational direction of the motor 800L of the left assembly LA through a position sensor 800Lb. The position sensor 800Lb may include at least one of a PCB 870 or a sensor 890. The rotational amount may mean angular displacement. The rotational speed may mean angular velocity. The processor 1000 may sense the rotational amount, rotational speed, or rotational direction of the motor 800 of the right assembly RA through a position sensor 800b. The position sensor 800b may include at least one of a PCB 870 or a sensor 890. The motors 800 and 800L may have brakes 800e and 800Le for braking the driving shafts 800d and 800Ld. The processor 1000 may control operation of the brakes 800e and 800Le in order to reduce the rotational speeds of the motors 800 and 800L or to stop driving of the motors 800 and 800L.

In the case in which the rotational amount of one of the motors 800 and 800L is larger, the processor 1000 may decrease the rotational speed of the motor having the larger rotational amount, or may stop driving of the motor having the larger rotational amount. Alternatively, in the case in which the rotational amount of one of the motors 800 and 800L is larger, the processor 1000 may increase the rotational speed of the motor having the smaller rotational amount.

In the case in which the rotational speed of one of the motors 800 and 800L is higher, the processor 1000 may decrease the rotational speed of the motor having the higher rotational speed, or may stop driving of the motor having the higher rotational speed. Alternatively, in the case in which the rotational speed of one of the motors 800 and 800L is higher, the processor 1000 may increase the rotational speed of the motor having the lower rotational speed.

Figure 33:
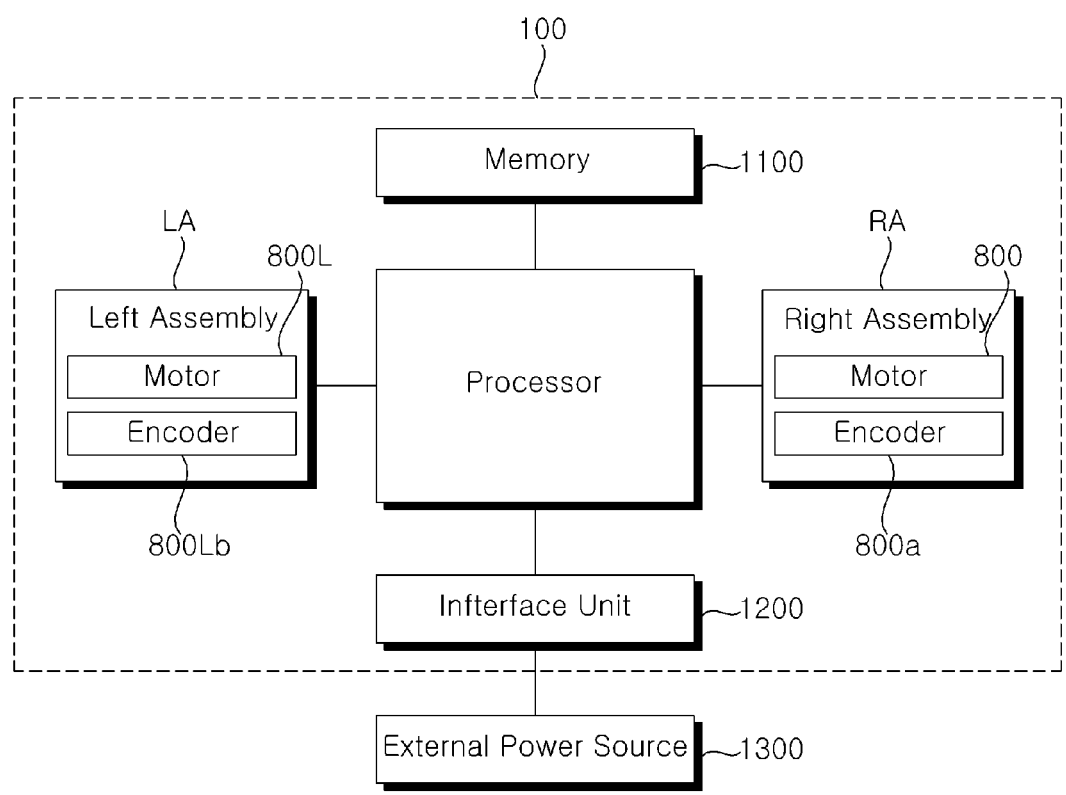

Referring to FIG. 33, the motors 800 and 800L may have encoders 800La and 800a for sensing rotational amounts, rotational speeds, or rotational directions of the driving shafts 800d and 800Ld. The processor 100 may receive information about the rotational amounts, rotational speeds, or rotational directions of the driving shafts 800d and 800Ld of the motors 800 and 800L through the encoders 800La and 800a. The motors 800 and 800L may have brakes 800e and 800Le for braking rotation of the driving shafts 800d and 800Ld. The processor may control operation of the brakes 800e and 800Le in order to reduce the rotational speeds of the motors 800 and 800L or to stop driving of the motors 800 and 800L.

In the case in which the rotational amount of one of the motors 800 and 800L is larger, the processor 1000 may decrease the rotational speed of the motor having the larger rotational amount, or may stop driving of the motor having the larger rotational amount. Alternatively, in the case in which the rotational amount of one of the motors 800 and 800L is larger, the processor 1000 may increase the rotational speed of the motor having the smaller rotational amount.

In the case in which the rotational speed of one of the motors 800 and 800L is higher, the processor 1000 may decrease the rotational speed of the motor having the higher rotational speed, or may stop driving of the motor having the higher rotational speed. Alternatively, in the case in which the rotational speed of one of the motors 800 and 800L is higher, the processor 1000 may increase the rotational speed of the motor having the lower rotational speed.

Figure 34:
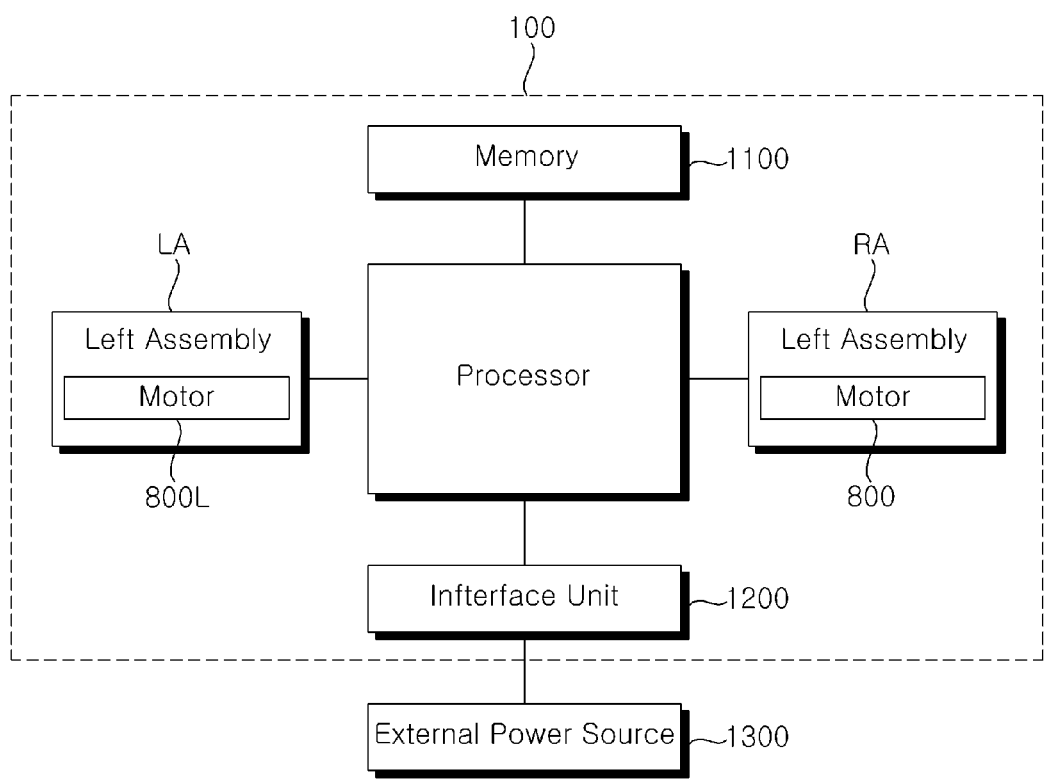

Referring to FIG. 34, each of the motors 800 and 800L may be a step motor, a stepper motor, or a stepping motor. The processor 1000 may simultaneously control the motors 800 and 800L. The processor 1000 may control the rotational amounts, rotational speeds, or rotational directions of the driving shafts 800d and 800Ld of the motors 800 and 800L. The rotational amounts of the driving shafts 800d and 800Ld of the motors 800 and 800L may mean the number of steps that the driving shafts 800d and 800Ld are rotated. The rotational speeds of the driving shafts 800d and 800Ld of the motors 800 and 800L may mean the number of steps that the driving shafts 800d and 800Ld are rotated per unit time. The motors 800 and 800L may have brakes 800e and 800Le for braking rotation of the driving shafts 800d and 800Ld. The processor 1000 may control operation of the brakes 800e and 800Le in order to reduce the rotational speeds of the motors 800 and 800L or to stop driving of the motors 800 and 800L. The processor 100 may receive information about the rotational amounts, rotational speeds, or rotational directions of the driving shafts 800d and 800Ld of the motors 800 and 800L from the motors 800 and 800L.

In the case in which the rotational amount of one of the motors 800 and 800L is larger, the processor 1000 may decrease the rotational speed of the motor having the larger rotational amount, or may stop driving of the motor having the larger rotational amount. Alternatively, in the case in which the rotational amount of one of the motors 800 and 800L is larger, the processor 1000 may increase the rotational speed of the motor having the smaller rotational amount.

In the case in which the rotational speed of one of the motors 800 and 800L is higher, the processor 1000 may decrease the rotational speed of the motor having the higher rotational speed, or may stop driving of the motor having the higher rotational speed. Alternatively, in the case in which the rotational speed of one of the motors 800 and 800L is higher, the processor 1000 may increase the rotational speed of the motor having the lower rotational speed.

As is apparent from the above description, a display device according to the present disclosure has the following effects.

According to at least one of the embodiments of the present disclosure, it is possible to reduce load at the time of initial driving for unwinding a display panel from a roller.

In addition, according to at least one of the embodiments of the present disclosure, it is possible to reduce initial driving force at the time of erecting a link.

In addition, according to at least one of the embodiments of the present disclosure, it is possible to reduce impact at the time of seating the link.

The additional scope of applicability of the present disclosure will be apparent from the above detailed description. However, those skilled in the art will appreciate that various modifications and alterations are possible, without departing from the idea and scope of the present disclosure, and therefore it should be understood that the detailed description and specific embodiments, such as the preferred embodiments of the present disclosure, are provided only for illustration.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a housing;
   a roller disposed in the housing;
   a display unit configured to be wound around or unwound from the roller;
   a foldable link having a first side pivotably coupled to the housing and a second side pivotably coupled to an upper part of the display unit;
   a motor disposed in the housing and configured to drive a pivoting movement of the foldable link such that the foldable link is extended out of or retracted into the housing;
   a fulcrum disposed adjacent to the first side of the foldable link;
   a lever extending in a longitudinal direction of the housing and pivotably mounted on the fulcrum and comprising a first side and a second side oppositely positioned with respect to the fulcrum; and
   an elastic member coupled to the second side of the lever,
   wherein when the foldable link is retracted into the housing the foldable link contacts the first side of the lever to cause the lever to pivot about the fulcrum.

2. The display device according to claim 1, wherein the foldable link comprises:
   a lower link having one side pivotably connected to the housing; and
   an upper link having one side pivotably connected to the lower link and the other side pivotably connected to the upper part of the display unit, and
   the lower link contacts the first side of the lever when the foldable link is retracted into the housing.

3. The display device according to claim 1, wherein the fulcrum comprises:
   a lever base coupled to the housing;
   a first support configured to support a first shaft; and
   a second support spaced apart from the first support and configured to support a second shaft parallel to the first shaft,
   wherein the lever is pivotably mounted at the first shaft of the first support, and
   the elastic member is coupled to the second shaft of the second support and the second side of the lever.

4. The display device according to claim 3, wherein the lever comprises:
   a middle region coupled to the first shaft of the first support;

a first body extending from the middle region toward a mounting position of the lower link;
a second body extending from the middle region opposite the first body;
a first fork formed at a distal end of the first body;
a second fork formed at a distal end of the second body;
a roller shaft extending across the first fork; and
a roller positioned on the roller shaft so as to be rotatable on the roller shaft.

5. The display device according to claim 4, wherein the roller comprises a urethane material.

6. The display device according to claim 4, wherein
the first body and second body are angled in an upward direction, and
the elastic member is an extension spring.

7. The display device according to claim 6, wherein the elastic member is extended when the foldable link is retracted into the housing and contracted when the foldable link is extended out of the housing.

8. The display device according to claim 4, wherein a distance between the prongs of the first fork is greater than a distance between prongs of the second fork.

9. The display device according to claim 1, wherein:
the motor comprises a rotary encoder configured to sense angular displacement of a driving shaft of the motor, and
the display device further comprises a controller configured to control the motor based on information about the angular displacement of the driving shaft acquired from the rotary encoder.

10. The display device according to claim 2, further comprising:
a first gear fixed to a driving shaft of the motor; and
a second gear fixed to the lower link and comprising a rotary shaft aligned with a pivot shaft of the lower link, wherein the second gear is engaged with the first gear.

* * * * *